United States Patent
Grollier

(10) Patent No.: US 12,106,207 B2
(45) Date of Patent: Oct. 1, 2024

(54) NEURAL NETWORK COMPRISING SPINTRONIC RESONATORS

(71) Applicants: THALES, Courbevoie (FR); CENTRE NATIONAL DE LA RECHERCHE SCIENTIFIQUE, Paris (FR)

(72) Inventor: Julie Grollier, Palaiseau (FR)

(73) Assignees: THALES, Courbevoie (FR); CENTRE NATIONAL DE LA RECHERCHE SCIENTIFIQUE, Paris (FR)

( * ) Notice: Subject to any disclaimer, the term of this patent is extended or adjusted under 35 U.S.C. 154(b) by 921 days.

(21) Appl. No.: 17/263,093

(22) PCT Filed: Jul. 25, 2019

(86) PCT No.: PCT/EP2019/070027
§ 371 (c)(1),
(2) Date: Jan. 25, 2021

(87) PCT Pub. No.: WO2020/021004
PCT Pub. Date: Jan. 30, 2020

(65) Prior Publication Data
US 2021/0201123 A1    Jul. 1, 2021

(30) Foreign Application Priority Data
Jul. 26, 2018  (FR) ...................................... 1800805

(51) Int. Cl.
*G06N 3/063* (2023.01)
*G06N 3/04* (2023.01)
(52) U.S. Cl.
CPC ............... *G06N 3/063* (2013.01); *G06N 3/04* (2013.01)

(58) Field of Classification Search
CPC ................................ G06N 3/04; G06N 3/063
See application file for complete search history.

(56) References Cited

U.S. PATENT DOCUMENTS

2011/0001473 A1* 1/2011 Moriyama ............. B82Y 25/00
324/244

OTHER PUBLICATIONS

Sengupta, ABhronil and Kaushik Roy. "Encoding Neural and SYnaptic Functionalities in Electron Spin: A Pathway to Efficient Neuromorphic Computing" Dec. 20, 2017 [Online] Downloaded Jun. 6, 2024 https://arxiv.org/pdf/1711.02235 (Year: 2017).*
LOcatelli, N, V. CRos, and J. Grollier. "SPin-torque building blocks" 2013 [Online] Downloaded Jun. 6, 2024 https://www.nature.com/articles/nmat3823 (Year: 2013).*

(Continued)

*Primary Examiner* — Ben M Rifkin
(74) *Attorney, Agent, or Firm* — ArentFox Schiff LLP

(57) ABSTRACT

The invention relates to a neural network comprising:
synaptic chains, each synaptic chain comprising synapses, each synapse being a spintronic resonator, the spintronic resonators being in series, each spintronic resonator having an adjustable resonance frequency,
ordered layers of neurons, each neuron being a radiofrequency oscillator oscillating at its own frequency, a lower layer being connected to an upper layer by an interconnection comprising an assembly of synaptic chains connected to rectifying circuits, each resonance frequency of the assembly of synaptic chains corresponding to the frequency of a radiofrequency oscillator of the lower layer.

13 Claims, 23 Drawing Sheets

(56) References Cited

OTHER PUBLICATIONS

Pan, CHenyun and Azad Naeemi. "A Proposal for Energy-Efficient Cellular Neural Network Based on Spintronic Devices" 2016 [Online] Downloaded Jun. 6, 2024 (Year: 2016).*
Grollier, Julie et al. "Spintronic Nanodevices for Bioinspired Computing" 2016 [Online] Downloaded Jun. 6, 2024 https://ieeexplore.ieee.org/stamp/stamp.jsp?arnumber=7563364 (Year: 2016).*
Locatelli, N. et al., "Spin-torque building blocks", Nature Materials, vol. 13, No. 1, pp. 11-20, DOI: 10.1038/nmat3823, (Jan. 2014).
Grollier, J. et al., "Spintronic Nanodevices for Bioinspired Computing", Proceedings of the IEEE, IEEE. New York, US, vol. 104, No. 10, pp. 2024-2039, (Oct. 2016).
Sengupta, A. et al., "Encoding neural and synaptic functionalities in electron spin: A pathway to efficient neuromorphic computing", Applied Physics Reviews—Focused Review, American Institute of Physics, 041105, vol. 4, No. 4, (23 Pages Total), (2017).
Zeng, L. et al., "Spin wave based synapse and neuron for ultra low power neuromorphic computation system", 2016 IEEE International Symposium On Circuits and Systems (ISCAS), IEEE, pp. 918-921, (2016).
Sengupta, A., et al.: "Performance analysis and benchmarking of all-spin spiking neural networks (Special session paper)", 2017 International Joint Conference on Neural Networks (IJCNN), IEEE, pp. 4557-4563, XP033112616, DOI: 10.1109/IJCNN.2017.7966434, May 14, 2017 (May 14, 2017).
French Search Report, from the French Patent Office in counterpart French Application No. 1800805, dated Jun. 12, 2019.
International Search Report, issued by International Searching Authority in corresponding International Application No. PCT/EP2019/070027, mailed on Oct. 24, 2019.

* cited by examiner

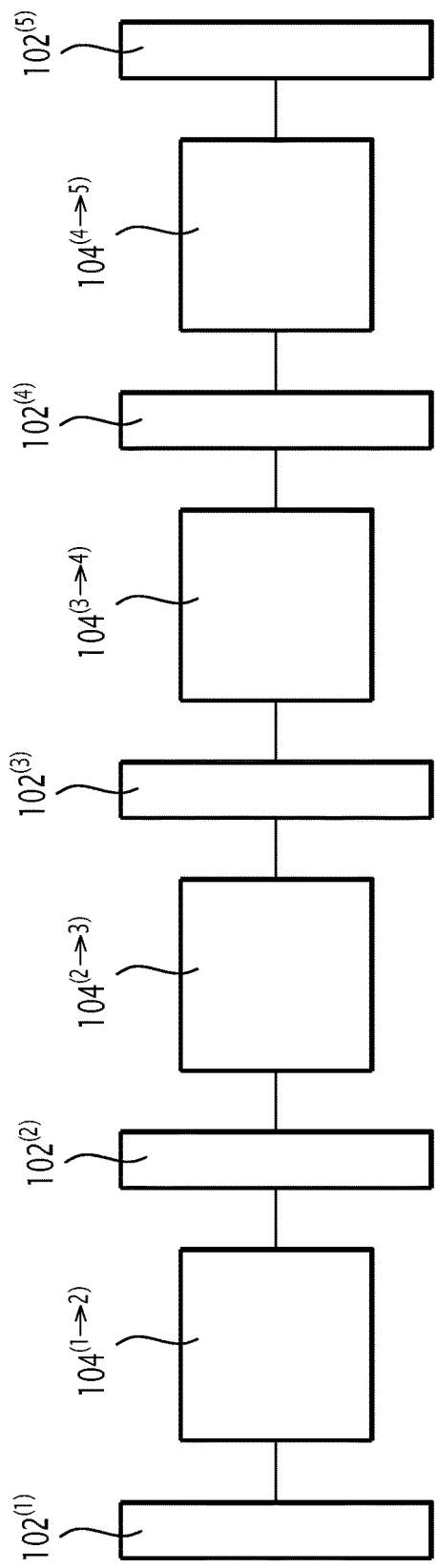
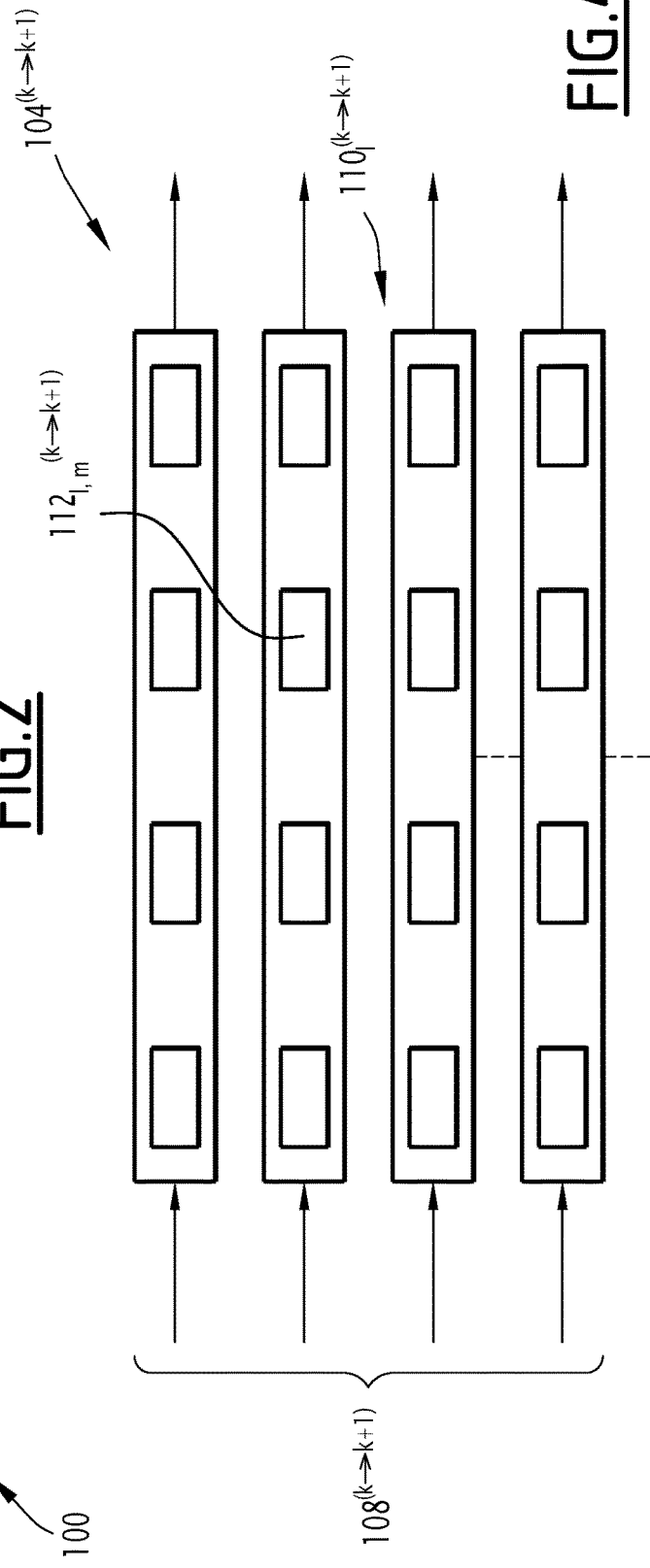

NEURAL NETWORK COMPRISING SPINTRONIC RESONATORS

CROSS-REFERENCE TO RELATED APPLICATIONS

This application is a National Stage Entry of International Patent Application No. PCT/EP2019/070027, filed on Jul. 25, 2019, which claims priority to French Application No. 18 00805, filed on Jul. 26, 2018. The disclosures of the priority applications are incorporated in their entirety herein by reference.

TECHNICAL FIELD OF THE INVENTION

The present invention relates to a neural network.

TECHNOLOGICAL BACKGROUND OF THE INVENTION

The development of the internet and connected sensors leads to the possibility of obtaining a considerable amount of data. This phenomenon often referred to as "big data" implies the use of computers to be able to exploit all the data obtained. Such exploitation can be used in many fields, including automatic data processing, diagnostic assistance, predictive analysis, autonomous vehicles, bioinformatics or monitoring.

To implement such exploitation, using automatic learning algorithms that are part of programs that can be executed on processors such as CPUs or GPUs was known. A CPU is a processor, the acronym CPU coming from the term "Central Processing Unit", which literally means central processing unit, while a GPU is a graphics processor, the acronym GPU coming from the term "Graphic Processing Unit", which literally means graphics processing unit.

Among learning implementation techniques, the use of formal neural networks, especially deep neural networks, is becoming more and more common, as these structures are considered very promising because of their performance in many tasks such as automatic data classification and pattern recognition.

A neural network is shown schematically in FIG. 1 and is generally composed of a succession of layers of neurons, each of which takes its inputs from the outputs of the previous layer. More precisely, each layer includes neurons taking their inputs from the outputs of the neurons of the previous layer. Each layer is connected by multiple synapses. A synaptic weight is related to each synapse. This is an actual number, which takes both positive and negative values. For each layer, the input of a neuron is the weighted sum of the outputs of the neurons of the previous layer, the weighting being done by the synaptic weights.

By definition, a deep neural network is a network with more than three layers of neurons and a large number of neurons per layer.

For an implementation in a CPU or GPU, a Von Neumann funnel problem (also called Von Neumann bottleneck) appears because the implementation of a deep neural network implies using both the memory(s) and the processor while the latter elements are spatially separated. The result is a congestion of the communication bus between the memory(s) and the processor.

It is therefore desirable to develop dedicated hardware architectures, bringing memory and computation closer together, in order to create neural networks that are fast, low-power and suitable for learning in real time.

Making neural networks on the basis of a CMOS-type technology was known. It is understood by the acronym "CMOS", Complementary Metal Oxide Semiconductor (acronym from the English expression "Complementary Metal-Oxide-Semiconductor"). The abbreviation "CMOS" refers to both a production method and a component produced by such a production method.

A neural network based on optical technologies is also known as a neural network.

More precisely, three architecture proposals are the subject of specific studies: CMOS neural networks and CMOS synapses, optical neural networks and optical synapses and CMOS neural networks and memristive synapses. Memristive synapses are synapses using memristors. In electronics, the memristor (or memristance) is a passive electronic component. The name is a portmanteau formed from two words, memory and resistor. A memristor efficiently stores information because the value of its electrical resistance changes permanently when a current is applied.

However, according to each of these technologies, each neuron occupies several tens of side micrometers. For CMOS and optical technologies, each synapse also occupies several tens of side micrometers. As a result, on a limited surface corresponding for example to a microchip, the number of neurons and synapses that can be integrated is limited, which results in a decrease in the performance of the neural network.

SUMMARY OF THE INVENTION

Therefore, there is a need for a neural network with improved performance, that is, a greater number of neurons and synapses.

For this purpose, the present description proposes a neural network comprising synaptic chains, each synaptic chain comprising synapses, each synapse being a spintronic resonator, the spintronic resonators being in series, each spintronic resonator having an adjustable resonance frequency, ordered layers of neurons, each neuron being a radiofrequency oscillator oscillating at its own frequency, a lower layer being connected to an upper layer by an interconnection comprising an assembly of synaptic chains connected to rectification circuits, each resonance frequency of the assembly of synaptic chains corresponding to the frequency of a radiofrequency oscillator of the lower layer.

In the present description, "neural network" is understood to be a hardware architecture for a neural network. Thus, this hardware architecture can also be referred to as a "device for the implementation of a neural network".

Such a neural network enables memory and computing to come closer together, to create fast, low-power neural networks suitable for learning in real time.

In particular, the input applied to the layers of neurons is a direct voltage and the output of the layers of neurons is an alternating current. Thus, the neurons of a lower layer send alternating current to the synaptic chains of the interconnection. The rectification circuit allows the signals at the terminals of the synaptic chains to be rectified. The rectification circuit then creates a direct voltage that is applied to the upper neuron layer.

In addition, because each resonance frequency of the synaptic chains corresponds to a natural frequency of a radiofrequency oscillator of the lower layer, an alternating current is created across the synaptic chains. This alternating current comes from a superposition of signals whose frequency is the difference in frequency between the natural frequency of a radiofrequency oscillator and the resonance frequency of the assembly of synaptic chains. The rectified voltage across the synaptic chain set depends on the frequency difference between the natural frequency of the radiofrequency oscillators of the lower layer and the resonance frequency of the synaptic chain set. In addition, the synaptic weights depend on the frequency difference between the resonance frequency and the oscillation frequency.

The above-mentioned elements work together to obtain a neural network with improved performance, that is, to obtain a greater number of neurons and synapses.

Depending on the particular embodiments, the neural network includes one or more of the following features when this is technically possible:

- for each resonance frequency of the synaptic chain set, the ratio between the resonance frequency considered and the natural oscillation frequency of a radio frequency oscillator of the lower layer is less than 1%.
- the neurons of the lower layer are suitable for transmitting a signal to the synaptic chains, the signal being a radiofrequency current, a radiofrequency magnetic field or a spin wave.
- the neural network has adjustment elements for adjusting the resonance frequency by changing one from amongst the voltage, the current or the magnetic applied to a spintronic resonator.
- a plane is defined in which the layers of neurons mainly extend, the synaptic chains being arranged perpendicularly to the plane.
- a plane is defined in which the layers of neurons mainly extend, the synaptic chains being arranged in the plane.
- the neural network comprises multiple spintronic memories, each spintronic memory being related to a single synaptic chain.
- the neural network uses positive and negative weights, each synaptic chain comprises two transmission lines, one line serving as a reference and one line comprising the resonators, the resonators being passive and each line being connected to two diodes, the assembly of diodes forming the rectification circuit, the assembly of two transmission lines making it possible to achieve one of the two weights.
- the number of layers is greater than 3, preferably greater than 5.
- the number of synaptic chains in a set is greater than 9, preferably greater than 100.
- the interconnection comprises a pre-processing circuit and a post-processing circuit.
- the pre-processing circuit comprises one from amongst a multiplexer and an amplifier and the post-processing circuit comprises one from amongst a memory and an amplifier.

The present description also relates to a synaptic chain of neural networks, the synaptic chain comprising synapses, each synapse being a spintronic resonator, the spintronic resonators being electrically connected in series by a transmission line and being alternately connected.

In the present description, "synaptic neural network chain" is understood to be a hardware architecture for a synaptic neural network chain. Thus, this hardware architecture can also be referred to as a "device for the implementation of a synaptic neural network chain".

Furthermore, as the term "a resonator" indicates, a resonator is a device having at least one resonance frequency. In particular, when an alternating signal has a frequency close to the resonance frequency of the resonator, the resonator has a resonance.

The alternating series connection of the resonators in the chain makes it possible to sum the rectified voltages of each resonator in the chain, while largely eliminating purely electrical terms.

For example, the rectified voltages can be obtained by the spin diode effect, by placing a p-n type diode or by using a rectification circuit composed of CMOS transistors connected to the spintronic resonators.

Depending on particular embodiments, the synaptic chain includes one or more of the following features when technically possible:

- each resonator has a stack of superimposed layers in a stacking direction and each resonator has, in the stacking direction, a first terminal and a second terminal, the transmission line has multiple transmission line portions, and for each resonator of the synaptic chain connected between a first resonator of the synaptic chain, called the "upstream resonator", and a second resonator of the synaptic chain, known as the "downstream resonator", the resonator in question is connected, on the one hand, to the downstream resonator by a first portion of transmission line electrically connecting the first terminal of the resonator in question and the first terminal of the downstream resonator and, on the other hand, to the upstream resonator by a second portion of transmission line electrically connecting the second terminal of the resonator in question and the second terminal of the upstream resonator.
- each resonator has terminals and a resonance frequency, each resonator being suitable for generating between the terminals a direct voltage whose amplitude depends on the deviation of the resonance frequency of the resonator from a reference frequency.
- each resonator is provided with a resonance frequency adjustment element, the adjustment element being selected from the group consisting of:
  - a magnetic pad suitable for generating a magnetic field on the resonator,
  - a pad with a variable magnetization according to the current applied to the pad,
  - a non-magnetic field line powered by a current suitable for creating a magnetic field on the resonator, and
  - a layer in a material having a different configuration depending on the current or voltage applied to the layer.
- at least one resonator comprises a stack of layers superimposed in a stacking direction, the stack comprising a first layer of ferromagnetic material, a layer of non-magnetic material and a second layer of ferromagnetic material, the layer of non-magnetic material being interposed between the two layers of ferromagnetic material.
- the material of each layer of non-magnetic material is an insulator.
- the material of each layer of non-magnetic material is a metal.
- at least one resonator has a single layer made of a magnetic material with anisotropic magneto-resistance properties.
- the assembly of synapses also includes an antenna, the antenna collecting an input signal to transmit it to the spintronic resonators.
- The input signal is a microwave signal.

The present description also relates to a neural network comprising at least one synaptic chain as described above.

The present description also relates to a synaptic chain of a neural network, the synaptic chain comprising a converter made of a metal with a strong inverse spin Hall effect, a transmission line, and synapses, each synapse being a spintronic resonator, the spintronic resonators being in contact with the converter and receiving signals, in particular from neurons of a previous layer, by the transmission line, each resonator being a magnetic pad, each resonator having a resonance frequency, each resonator being suitable for generating a spin current whose amplitude depends on the ratio between the resonance frequency of the resonator and a reference frequency, the converter being suitable for converting each spin current into a load current.

The inverse spin Hall effect makes it possible to obtain rectified voltages at the terminals of the synaptic chain.

In particular, thanks to the fact that each resonator is able to generate a spin current whose amplitude depends on the ratio between the resonance frequency of the resonator and a reference frequency, a synaptic weight adjustable by the variable frequency of the resonator can be obtained.

In addition, the above-mentioned elements of the synaptic chain work together to obtain a direct voltage in a simple and compact way. The direct voltage weights the amplitude of the alternating signals coming from the neurons of an upstream layer of the neural network with synaptic weights. In addition, the resulting direct voltage is transmitted to the input of a neuron in a downstream layer of the neural network. In addition, the synaptic weights are a function of the resonator frequency and can be adjusted by changing the resonance frequency of the resonators.

Depending on the particular embodiments, the synaptic chain includes one or more of the following features where technically possible:
  a metal with a strong inverse spin Hall effect has an efficiency of conversion of the spin current into load current greater than 5%.
  the signals are microwave signals.
  the resonators are electrically connected in series and alternately by the converter.
  each resonator has, along a predefined direction, a first terminal and a second terminal, and the converter has converter portions, for each resonator of the synaptic chain connected between a first resonator of the synaptic chain, called the "upstream resonator", and a second resonator of the synaptic chain, called the "downstream resonator", the resonator in question is connected, on the one hand, to the downstream resonator by a first converter portion electrically connecting the first terminal of the resonator in question and the first terminal of the downstream resonator and, on the other hand, to the upstream resonator by a second converter portion electrically connecting the second terminal of the resonator in question and the second terminal of the upstream resonator.
  the neural network uses positive and negative weights, the assembly of resonators electrically connected in series and alternately by the converter being a structure allowing to achieve one of the two weights.
  the metal of the converter is an alloy comprising at least one of the elements from the group consisting of Pt, W, Pd, Au, Ag, Ir and Bi.
  each resonator has a layer made of an oxide, ferroelectric or phase-change material.
  each resonator is provided with a resonance frequency adjustment element, the adjustment element being selected from the group consisting of:
    a magnetic pad, the magnetic pad having a variable magnetization depending on the load current applied to the magnetic pad,
    a magnetic pad, the magnetic pad having a variable direction of magnetization depending on the load current, the magnetization of the magnetic pad being fixed,
    a field line powered by a direct current suitable for creating a magnetic field on the resonator.
  the adjustment element is a magnetic pad, the magnetic pad being in contact with the transmission line or the magnetic pad being arranged at a distance from the transmission line, with insulating material being interposed between the magnetic pad forming the adjustment element and the transmission line.
  each magnetic pad has a trapezoidal cross-sectional shape.

The present description also relates to a neural network with at least one synaptic chain as described above.

BRIEF DESCRIPTION OF THE FIGURES

Other features and advantages of the invention will appear when reading the following description of the embodiments of the invention, given as an example only and with reference to the drawings which are:
FIG. 2, a block diagram representation of a neural network comprising layers of neurons and interconnections;
FIG. 4, a block diagram representation of an interconnection in FIG. 2.

DETAILED DESCRIPTION OF PREFERRED EMBODIMENTS

General Architecture and Notations

Figure 1:
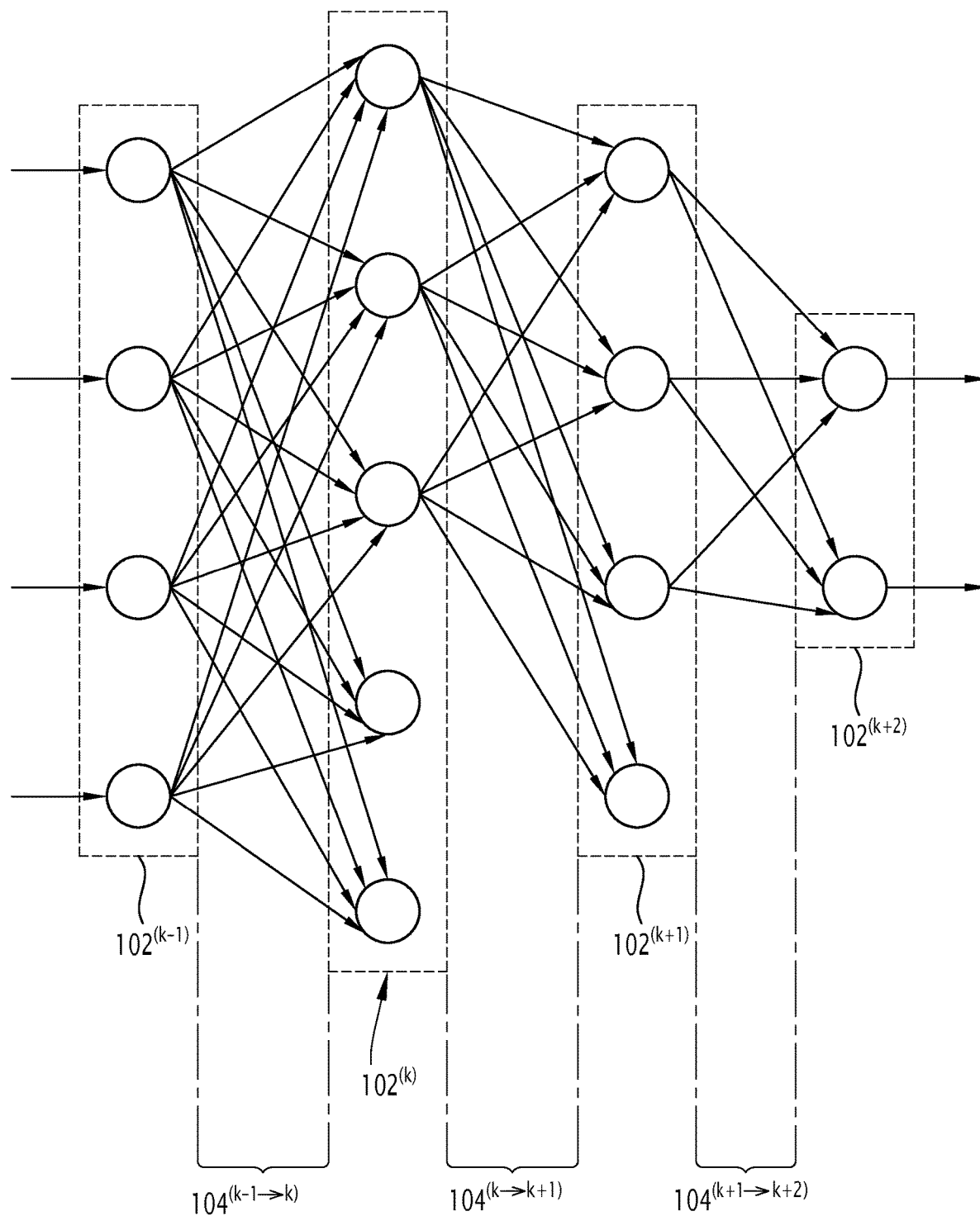
FIG. 1, a schematic representation of a neural network.

A neural network 100 is shown in FIG. 2.

The neural network 100 is a deep neural network.

The neural network 100 consists of layers of neurons 102 and interconnections 104 between the layers of neurons 102.

Each neuron layer 102 is an assembly of at least two neurons 106.

By definition, in biology, a neuron, or nerve cell, is an excitable cell that constitutes the basic functional unit of the nervous system. Neurons transmit a bioelectric signal called a nerve impulse. Neurons have two physiological properties: excitability, which is the ability to respond to stimuli and convert them into nerve impulses, and conductivity, which is the ability to transmit impulses. In formal neural networks, the behavior of biological neurons is imitated by a mathematical function that has the property of being non-linear (to be able to transform the input in a useful way) and preferably derivable (to allow learning by back-propagation of the gradient). In the context of this application, a neuron is a component performing an equivalent function.

The layers of neurons 102 are ordered, so that it is possible to define a k-index for each neuron layer 102.

k is an integer greater than 3, preferably greater than 5. This means that the number of layers of neurons 102 is greater than 3, preferably greater than 5.

By definition, the terms "higher" or "lower" not accompanied by the term "equal" are to be understood in the strict sense.

In this case, this implies that k>3, preferably k>5.

In the remainder of the present application, the terms "upstream" and "downstream" are defined in relation to the meaning of the increasing index k.

Also, when two layers of neurons 102 are consecutive, that is, linked only by a single interconnection 104, the first neuron layer will be called "upstream layer" and referenced $102^{(k)}$ and the second neuron layer will be called "downstream layer" and referenced $102^{(k+1)}$. In such a case, equivalently, the "upstream layer" may be referred to as the "lower layer" and the "downstream layer" may be referred to as the "upper layer".

Each neuron layer 102 is connected by an interconnection 104 to another neuron layer 102. Thus, a lower layer $102^{(k)}$ is connected to an upper layer $102^{(k+1)}$ by an interconnection $104^{(k \to k+1)}$.

In addition, in this described example, the number of layers of neurons 102 is equal to five.

As a result, the index k varies between 1 and 5.

The first neuron layer $102^{(1)}$ is connected to the second neuron layer $102^{(2)}$ by a first interconnection $104^{(1 \to 2)}$, the second neuron layer $102^{(2)}$ is connected to the third neuron layer $102^{(3)}$ by a second interconnection $104^{(2 \to 3)}$, the third neuron layer $102^{(3)}$ is connected to the fourth neuron layer $102^{(4)}$ by a third interconnection $104^{(3 \to 4)}$ and the fourth neuron layer $102^{(4)}$ is connected to the fifth neuron layer $102^{(5)}$ by a fourth interconnection $104^{(4 \to 5)}$.

Figure 3:
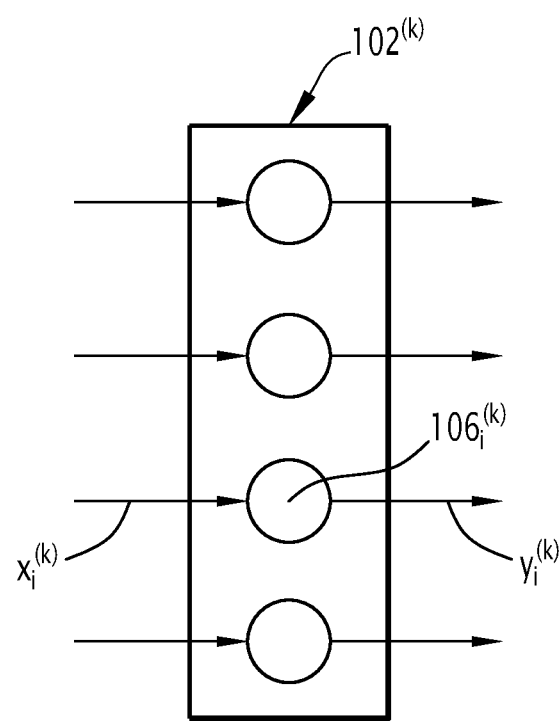
FIG. 3, a block diagram representation of a layer in FIG. 2.

With reference to FIG. 3, which shows an upstream layer, the number of neurons 106 in neuron layer each $102^{(k)}$ is denoted as $N^{(k)}$.

Thereafter, an order is defined for the neurons 106 of a layer $102^{(k)}$.

The neurons 106 of an upstream layer $102^{(k)}$ are marked by an index i, i being an integer between 1 and $N^{(k)}$. The i-th neuron 106 of the upstream layer $102^{(k)}$ is denoted $106_i^{(k)}$. In addition, the input signal of the i-th neuron $106_i^{(k)}$ of the upstream layer $102^{(k)}$ is denoted $x_i^{(k)}$ and the output signal of this neuron $106_i^{(k)}$ is denoted $y_i^{(k)}$.

Similarly, neurons 106 of a downstream layer $102^{(k+1)}$ are marked by an index j, j being an integer varying between 1 and $N^{(k+1)}$. The j-th neuron 106 of the downstream layer $102^{(k+1)}$ is denoted $106_j^{(k+1)}$. In addition, the input signal of the j-th neuron $106_j^{(k+1)}$ of the downstream layer $102^{(k+1)}$ is denoted $x_j^{(k+1)}$ and the output signal of this neuron $106_j^{(k+1)}$ is denoted $y_j^{(k+1)}$.

With reference to FIG. 4, the interconnection $104^{(k \to k+1)}$ between the upstream layer $102^{(k)}$ and the downstream layer $102^{(k+1)}$ comprises a set $108^{(k \to k+1)}$ of synaptic chains $110^{(k \to k+1)}$.

By definition, a synaptic chain $110^{(k \to k+1)}$ of the interconnection $104^{(k \to k+1)}$ between the upstream layer $102^{(k)}$ and the downstream layer $102^{(k+1)}$ is an assembly of synapses $112^{(k \to k+1)}$ generally connected in series.

In biology, the synapse designates a zone of functional contact between two neurons. Depending on its behavior, the biological synapse can excite or inhibit the downstream neuron in response to the upstream neuron. In formal neural networks, a positive synaptic weight corresponds to an excitatory synapse while a negative synaptic weight corresponds to an inhibitory synapse. Biological neural networks learn by modifying synaptic transmissions throughout the network. Similarly, formal neural networks can be trained to perform tasks by modifying synaptic weights according to a learning rule. One of the most efficient learning rules for training deep networks today is the backpropagation of the gradient. In this application, a synapse is a component performing a function equivalent to a synaptic weight of modifiable value.

Furthermore, in the following, we will call "synaptic chain" or "chain" an assembly of synapses linked in chains, whose function is to connect all or a subset of neurons from the upstream layer to the downstream layer. More precisely, the output of a synaptic chain is proportional to the weighted sum of the outputs of the neurons of the preceding layer that are connected at the input of the chain, the weighting being made by the synaptic weights of the synapses that make up the chain.

The number of chains $110^{(k \to k+1)}$ of the set $108^{(k \to k+1)}$ of the interconnection $104^{(k \to k+1)}$ between the upstream layer $102^{(k)}$ and the downstream layer $102^{(k+1)}$ is denoted $L^{(k \to k+1)}$.

The number $L^{(k \to k+1)}$ of chains $110^{(k \to k+1)}$ of the set $108^{(k \to k+1)}$ of the interconnection $104^{(k \to k+1)}$ between the upstream layer $102^{(k)}$ and the downstream layer $102^{(k+1)}$ is greater than 9, preferably greater than 100.

In addition, the chains $110^{(k \to k+1)}$ of the interconnection $104^{(k \to k+1)}$ between the upstream layer $102^{(k)}$ and the downstream layer $102^{(k+1)}$ are ordered so that each chain $110^{(k \to k+1)}$ of the interconnection $104^{(k \to k+1)}$ between the upstream layer $102^{(k)}$ and the downstream layer $102^{(k+1)}$ can be identified by an integer I, with I varying from 1 to $L^{(k \to k+1)}$.

Therefore, the I-th chain $110^{(k \to k+1)}$ of the interconnection $104^{(k \to k+1)}$ between the upstream layer $102^{(k)}$ and the downstream layer $102^{(k+1)}$ is denoted $110_I^{(k \to k+1)}$.

The synapses $112^{(k \to k+1)}$ of a synaptic chain $110^{(k \to k+1)}$ of the interconnection $104^{(k \to k+1)}$ between the upstream layer $102^{(k)}$ and the downstream layer $102^{(k+1)}$ are ordered in the synaptic chain $110^{(k \to k+1)}$ so that each synapse $112^{(k \to k+1)}$ can be identified by an index m, m being an integer varying from 1 to $M_L^{(k \to k+1)}$ more simply denoted $M_L$ in the case described here. The integer $M_L$ designates the number of synapses $112^{(k \to k+1)}$ of a synaptic chain $110^{(k \to k+1)}$.

Preferably, the integer $M_L$ is an even integer.

As a result, the m-th synapse $112^{(k \to k+1)}$ of the I-th synaptic chain $110_I^{(k \to k+1)}$ of the interconnection $104^{(k \to k+1)}$ between the upstream layer $102^{(k)}$ and the downstream layer $102^{(k+1)}$ is denoted $112_{I,m}^{(k \to k+1)}$.

In the general case, each integer $N^{(k)}$, $L^{(k \to k+1)}$, $M_L$ varies from one neuron layer 102 to another. For the rest, the description will focus on describing only an upstream layer $102^{(k)}$, a downstream layer $102^{(k+1)}$ and especially the interconnection $104^{(k \to k+1)}$ between the two layers $102^{(k)}$ and $102^{(k+1)}$, for the sake of simplification, it is assumed that the integers $N^{(k)}$, $L^{(k \to k+1)}$, $M^{L^{(k \to k+1)}}$ do not vary from one neuron layer 102 to another neuron layer 102, so that exponents involving notations with k can be omitted when there are no ambiguities.

Similarly, again for simplicity, it is assumed, for example, that the integers $N^{(k)}$, $L^{(k \to k+1)}$ and $M_L$ are equal, knowing that this is not generally the case. However, the transposition to cases where the integers are distinct is immediate and is not described in the following.

As a result, the following notations will be used in the following:
- the i-th neuron 106 of the upstream layer $102^{(k)}$ is denoted $106_i$. In addition, the input signal of the i-th neuron $106_i$ of the upstream layer $102^{(k)}$ is denoted $x_i$ and the output signal of this neuron $106_i$ is denoted $y_i$. The index i varies between 1 and N.
- the j-th neuron 106 of the downstream layer $102^{(k+1)}$ is denoted $106_j$. In addition, the input signal of the j-th neuron $106_j$ of the downstream layer $102^{(k+1)}$ is denoted $x_j$ and the output signal of this neuron $106_j$ is denoted $y_j$. The index j varies between 1 and N.
- the I-th chain 110 of the interconnection $104^{(k \to k+1)}$ between the upstream layer $102^{(k)}$ and the downstream layer $102^{(k+1)}$ is denoted $110_I$. The index I varies between 1 and N.
- the m-th synapse 112 of the I-th synaptic chain $110_I$ of the interconnection $104^{(k \to k+1)}$ between the upstream layer $102^{(k)}$ and the downstream layer $102^{(k+1)}$ is denoted $112_{I,m}$. The index m varies between 1 and N.

Such a simplification has the sole object of facilitating the following reading, the extension to cases where each integer $N^{(k)}$, $L^{(k \to k+1)}$, $M_L$ varies from one neuron layer 102 to another and are not equal to each other being immediate.

The general architecture that has just been described is now described by reference to examples explained in what follows.

Layers of Neurons

General

Each neuron 106, whether from the upstream layer $102^{(k)}$ or the downstream layer $102^{(k+1)}$, is an oscillator with a frequency ranging from 1 Megahertz (MHz) to several Terahertz (THz). The term "radiofrequency" will be used hereafter to refer to this frequency range.

An oscillator is a device suitable for generating oscillations with a controlled amplitude and a fixed or controlled frequency on one or more outputs.

For each neuron $106_i$ a specific oscillation frequency is defined, denoted $\omega_i$ when it is a neuron $106_i$ of the upstream layer $102^{(k)}$ or denoted $\omega_j$ when it is a neuron $106_j$ of the downstream layer $102^{(k+1)}$.

An oscillator being likely to have several oscillation frequencies, by definition, the oscillation frequency of a neuron $106_i$ is the frequency of the oscillation with the highest amplitude (the amplitude being defined in peak to peak).

In the following, the case of neurons $106_i$ of the upstream layer $102^{(k)}$ is more specifically detailed, with the same remarks applying for neurons $106_j$ of the downstream layer $102^{(k+1)}$.

In the case illustrated, the neurons $106_i$ of the upstream layer $102^{(k)}$ all have distinct oscillation frequencies $\omega_i$ two by two.

In another variant, it is possible that some oscillation frequencies $\omega_i$ are identical.

The neurons $106_i$ of the $102^k$ upstream layer are suitable for emitting an output signal $y_i$ in the direction of the synapses $112_{l,m}$ of the chains 110.

Depending on the implementation, the signal is a radio frequency electric current, a radio frequency electromagnetic field or a spin wave.

Spin waves are fluctuations in the magnetization of ferromagnetic materials around the equilibrium position of magnetization. The spin wave can be localized or propagated. A ferromagnetic material has spontaneous magnetization, unlike non-magnetic materials.

In physics, magnetization is a vectorial quantity that characterizes the magnetic behavior of a material sample on a macroscopic scale. The origin of magnetization is the orbital magnetic moment and the spin magnetic moment of the electrons.

First Implementation

According to a first implementation, each $106_i$ neuron of the $102^{(k)}$ upstream layer is a CMOS oscillator.

The creation of such an oscillator is based on the transposition of existing electronic assemblies, such as the Colpitts oscillator, the Clapp oscillator, the phase-shift oscillator, the Pierce oscillator, the Hartley oscillator, the Leaky Integrate and Fire oscillator and its different versions or the state variable oscillator.

Figure 5:
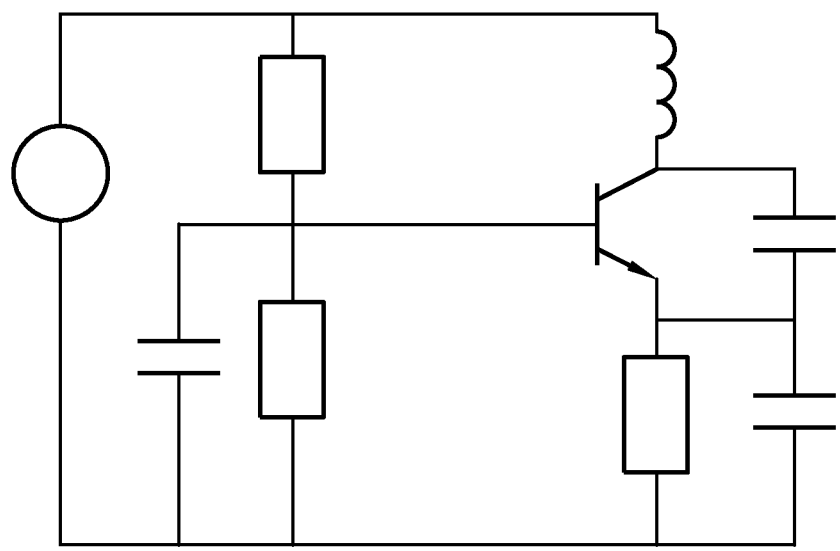
FIG. 5, a block diagram representation of an electrical block diagram equivalent to a CMOS oscillator.

With reference to FIG. 5, such an electronic scheme is proposed for a Colpitts oscillator, each component (inductor, resistor, capacitor and transistor) being achieved in CMOS technology.

This allows to obtain a CMOS oscillator with an oscillation signal with a fixed frequency and a controllable amplitude. The result is a high-power output and low noise.

Second Implementation

According to a second implementation, each neuron $106_i$ of the upstream layer $102^{(k)}$ r is a spintronic oscillator.

Such an implementation reduces the clutter of the first implementation.

Spintronic oscillators enable the obtaining of oscillation frequencies w over a wide range of frequencies, between 1 Megahertz (MHz) and several Terahertz (THz), especially when antiferromagnetic materials are used.

Antiferromagnetism is a property of certain magnetic media. Unlike ferromagnetic materials, in antiferromagnetic materials the exchange interaction between neighboring atoms leads to an antiparallel alignment of atomic magnetic moments. The total magnetization of the material is then zero. Like ferromagnets, these materials become paramagnetic above a transition temperature called Neel temperature.

Antiferromagnetism is distinct from ferromagnetism, which refers to the ability of certain bodies to magnetize themselves under the effect of an external magnetic field and to keep part of this magnetization.

In addition, spintronics, spin electronics or magnetoelectronics, is a technique that exploits the quantum property of electron spin in order to store information or perform computational operations on this information. By extension, a spintronic component is a component that exploits the quantum property of electron spin for the purpose of storing or processing information.

Spintronic oscillators can generate harmonic or stochastic signals. In the latter case the oscillator is said to be superparamagnetic. Superparamagnetism is a behavior of ferromagnetic or ferrimagnetic materials with grains of nanometric dimensions. The magnetization of these grains can reverse spontaneously under the influence of temperature. The mean time between two reversals, called the Neel relaxation time, defines the oscillation frequency.

Figure 6:
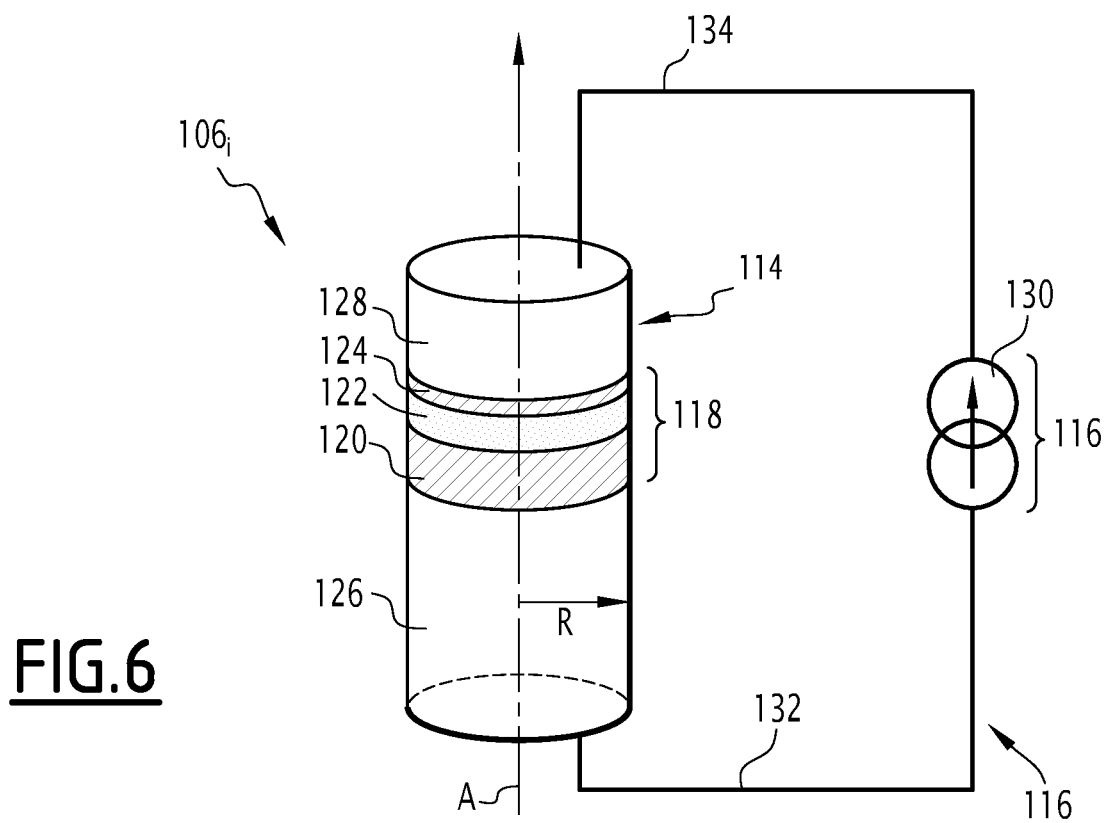
FIG. 6, a block diagram representation of an example of neurons.

An example of a neuron $106_i$ is shown schematically in FIG. 6. The neuron $106_i$ includes a nanopillar 114 and means to inject a supply current 116 through the nanopillar 114.

The characteristic diameter of a nanopillar is between 3 nanometers (nm) and 1 micrometer (μm).

Nanopillar 114 has a pattern 118. This consists of several layers, which are superimposed along a stacking direction A, namely a first layer 120 made of a ferromagnetic material, an intermediate layer 122 made of a non-magnetic material, and a second layer 124 made of a ferromagnetic material.

At each of its ends, the nanopillar 114 has lower layer 126 and upper layer 128 respectively, which are arranged on either side of the pattern 118 and constitute contacts allowing the injection of a supply current through layers 120, 122 and 124.

The ferromagnetic materials considered for the magnetic layers are iron Fe, cobalt Co, nickel Ni and ferromagnetic alloys comprising at least one of these elements (CoFeB for example), as well as Heusler materials, ferromagnetic oxides or ferromagnetic semiconductors. The ferromagnetic material of the second layer 124 is not necessarily identical to that of the first layer 122.

The non-magnetic intermediate layer 122 is a conductive layer, made for example of copper Cu, gold Au, etc., or an insulating layer, made for example of $Al_2O_3$, MgO, $SrTiO_3$, etc.

The layers 120, 122 and 124 have a thickness between a few tenths and a few tens of nanometers. One or more of the layers 120, 122 and 124 have reduced lateral dimensions between 5 nm and 1 μm. The other layers can be extended (from a few micrometers to several millimeters).

In the case of layer 124, this then allows the propagation of spin waves.

The lower and upper layers 126 and 128 are made of materials such as ruthenium, copper or gold. These layers have a thickness of about 25 nm. They preferably have a radius similar to that of the constituent layers of the pattern 118.

The means 116 suitable for injecting a supply current through the nanopillar 114 are shown schematically in FIG. 6 by a power source 130 suitable for delivering either a direct current, or an alternating current adjustable in intensity and frequency, or both, and electrodes 132 and 134.

These electrodes 132 and 134 make it possible to electrically connect the lower and upper layers 126 and 128 to the terminals of the source 130 for the injection of the supply current on the one hand, and to a measuring means (not shown) for the determination of the electrical potential difference across the nanopillar 114, that is, between the lower and upper layers 126 and 128, on the other hand.

Alternatively, the lower or upper layers 126 and 128 are made with a metal having the property of generating a strong spin Hall effect, that is, metal alloys containing one of the following elements: Pt, Pd, W, Ir, Bi, Au.

The spin Hall effect is a phenomenon of electrical transport and spin. This effect consists in the appearance of an accumulation of spin on the lateral surfaces of a conductive bar in which an electric current is propagated, the signs of the directions of spin being opposite on the opposite surfaces. In a cylindrical wire, the surface spins thus induced by the current rotate along the wire. When the current changes signs, the spins point in the opposite direction. The accumulation of spin thus generated can induce by spin transfer the reversal of magnetization of a magnetic layer placed in contact with one of the surfaces of the conductor bar where the current is injected.

In this case, layers 126 or 128 have a thickness between 3 nanometers (nm) and 15 nm. These electrodes are then wider than pillar 114 and extended to allow the injection of the current necessary to generate the spin accumulation by spin Hall effect. The current injection is then done in the plane of electrode 132 or 134. The injection means 116 are then such that the current source 130 is connected on either side of electrode 132 or electrode 134.

The first and second ferromagnetic layers 120 and 124 are characterized by specific remanent states shown in FIGS. 13-18.

Figure 14:
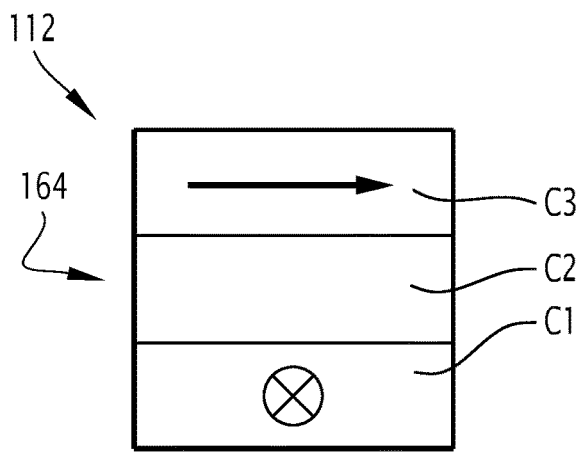
Figure 15:
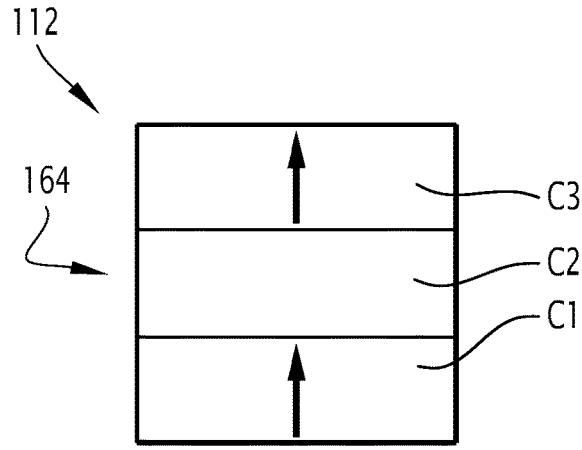
Figure 16:
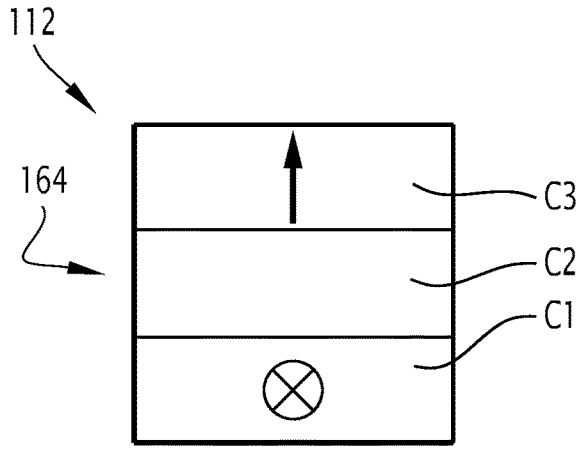
Figure 17:
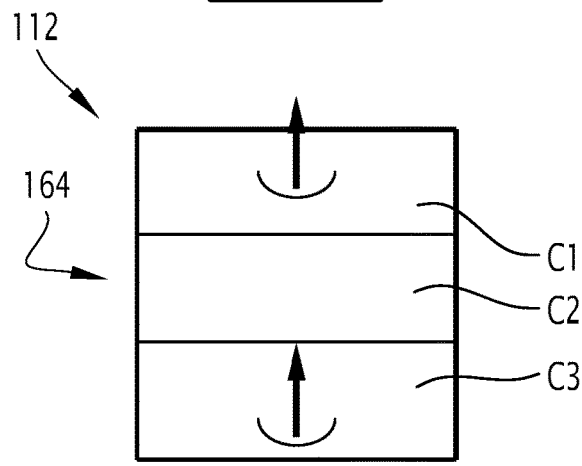

Specifically, FIGS. 13-16 describe magnetization equilibrium configurations such that the first ferromagnetic layers 120 and 124 have uniform (or substantially uniform) magnetization and exhibit the properties described below: the magnetizations of the two ferromagnetic layers 120 and 124 point in the plane of the ferromagnetic layers 120 and 124 and are aligned for the case of FIG. 13; the magnetizations of the two ferromagnetic layers 120 and 124 for the case of FIG. 14 point in the plane of the ferromagnetic layers 120 and 124 and are orthogonal; the magnetizations of the two ferromagnetic layers 120 and 124 for the case of FIG. 15 point out of the plane of ferromagnetic layers 120 and 124 and are aligned and for the case of FIG. 16, one of the magnetizations is out of the plane of ferromagnetic layers 120 and 124 and the other magnetization is in the plane of ferromagnetic layers 120 and 124. In the specific case of FIG. 17, the configuration of the two ferromagnetic layers 120 and 124 is a vortex type configuration. The magnetization forms a spiral in the plane of ferromagnetic layers 120 and 124 except in the core of the vortex in the center where the magnetization points out of the plane of ferromagnetic layers 120 and 124. Depending on the case, the vortices of the two ferromagnetic layers 120 and 124 have identical or opposite chiralities or polarities. Chirality is the direction of rotation of the vortex while polarity is the orientation of the magnetization of the core.

Figure 18:
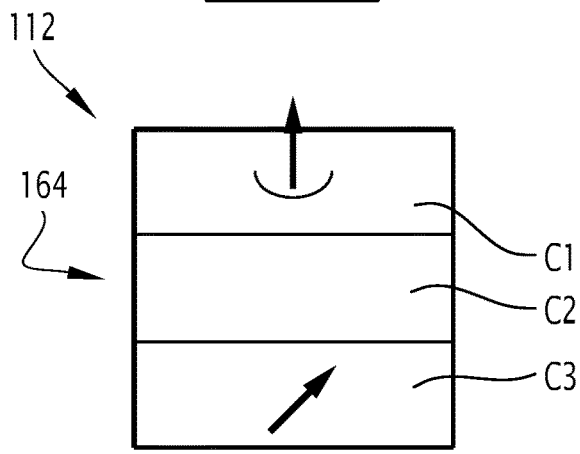

The case of FIG. 18 corresponds to a mixed configuration, that is, a vortex configuration in one of the two ferromagnetic layers 120 and 124 while the configuration of the magnetization in the other ferromagnetic layer 120 or 124 is uniform with any direction with respect to the plane of the two ferromagnetic layers 120 and 124.

Other configurations exist and complete the cases of FIGS. 13 to 18 which form a non-exhaustive list.

The stacking of the layers of nanopillar 114, lower layer, pattern layers and upper layer, is achieved by techniques such as sputtering, molecular beam epitaxy or pulsed laser ablation.

The shaping of the pillar layers is done by techniques combining electron lithography, optical lithography, laser lithography or focused ion etching, followed by an etching technique.

Figure 7:
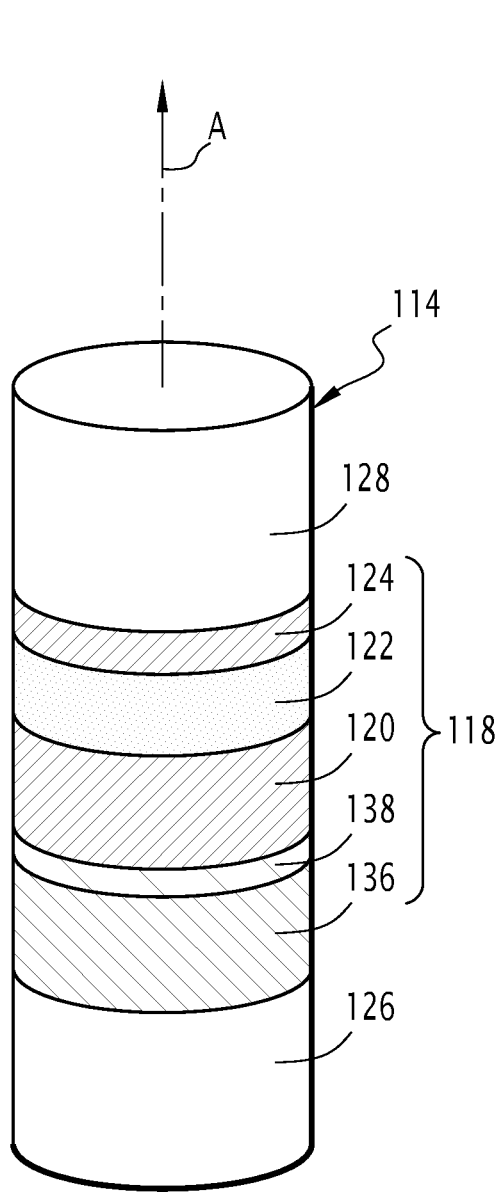
FIG. 7, a schematic representation of another example of neurons.

In a first variant of the magnetic oscillator, shown in FIG. 7, in addition to having first and second ferromagnetic layers 120 and 124, and an intermediate layer 122 located between the first and second layers, the pattern 118 of the nanopillar 114 of this oscillator has a third magnetic element 136. This element 136 can be a single ferromagnetic layer with a fixed and uniform magnetization. An alternative for this element 136 is an assembly of two exchange-coupled ferromagnetic layers biased by an antiferromagnetic layer, known to those skilled in the art as "synthetic antiferromagnetic" (SAF). In all cases, this third element 136 acts as a detector.

Favorably, this third magnetic layer 136 is located below the first layer 120 or above the second layer 124, along the A axis, and is separated from it by a separation layer 138. The separation layer 138 is made of a metallic material such as Ru, Cu and has a thickness of about 1 nm.

Figure 8:
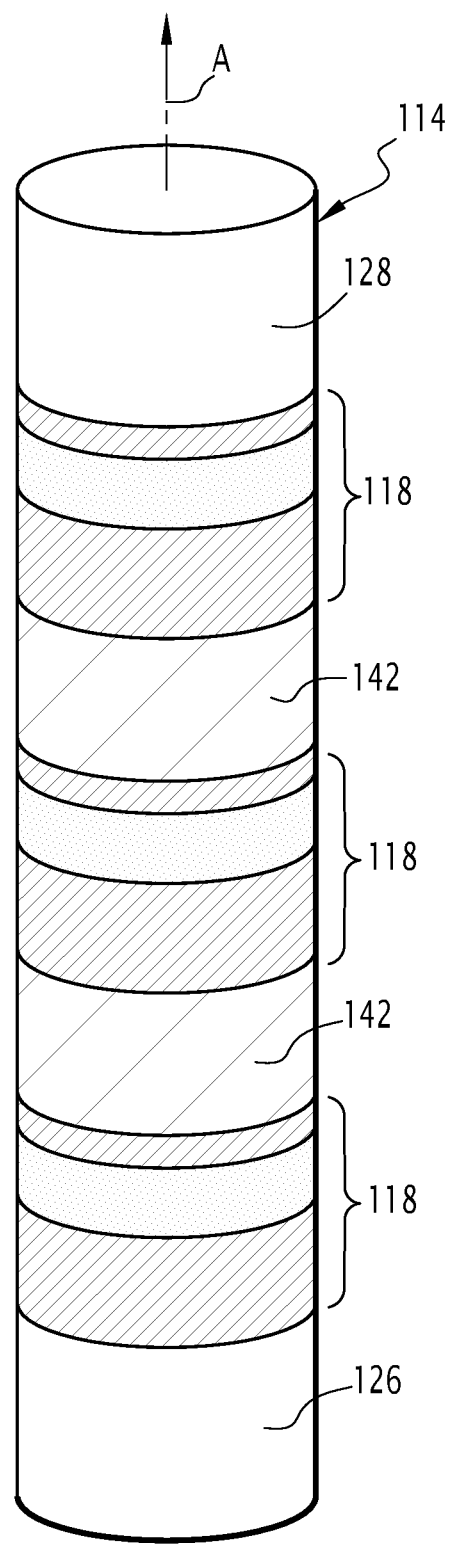
FIG. 8, a schematic representation of still another example of a neural set.

In a second variant, shown in FIG. 8, the elementary pattern 118 of the nanopillar 114 in FIG. 6 (consisting of a first ferromagnetic layer 120, a non-magnetic intermediate layer 122 and a second ferromagnetic layer 124) is repeated at least a second time along the A-axis of the nanopillar 114. Similarly, in an alternative to this second variant, the elementary pattern that is repeated is constituted by the pattern 118 shown in FIG. 7.

Within nanopillar 114, the patterns are separated from each other by a separating layer 142. This is made of a metallic material.

The previously presented oscillators can be arranged in different ways to form a neuron layer 102.

In one example, the oscillators are placed in line. In such a case, the oscillators are not electrically connected.

In another example, the oscillators are placed in line and connected in order to achieve multiplexing of the oscillator output signals.

Figure 9:
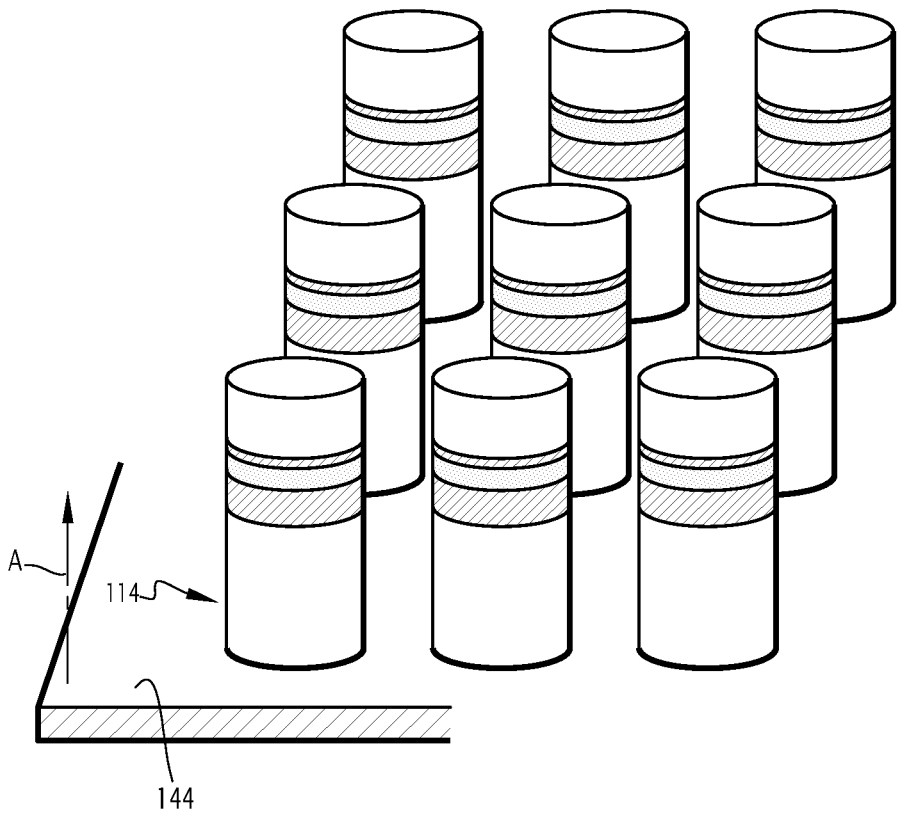
FIG. 9, a schematic representation of still another example of an assembly of neurons.

According to a variant shown in FIG. 9, N nanopillars 114, each identical to that of FIG. 6, FIG. 7 or FIG. 8 (or their variants), are periodically arranged on a planar substrate 144. A two-dimensional lattice of nanopillars 114 is then generated. In such a case, the means of injecting a supply current are electrodes connecting the different nanopillars 114.

Conclusion

As described above, multiple embodiments are possible for the neurons 106.

However, it should be noted that, preferably, each oscillator has the same structure as the synapses 112 which will be described below. The adaptation of the reference signs used later, namely C1, C2 and C3 to the previous description being immediate, it is not detailed in the following.

As a result, the remarks relating to the possible structures for an oscillator also apply to the synapses 112. Some of them are repeated, but not all of them for pedagogical reasons. Conversely, all the remarks relating to the possible structures for a synapse 112 also apply to an oscillator.

Figure 13:
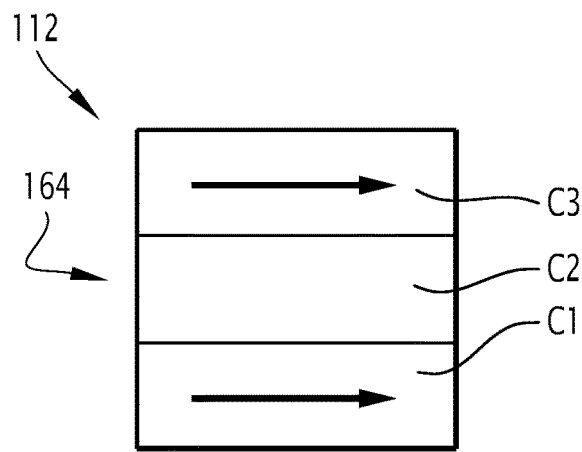
FIGS. 13 to 18, a schematic representation of the resonator magnetization configurations of FIG. 12.

In particular, the configurations presented in reference to FIGS. 13 and 18 are also valid for the cases of the synapses 112 when such configurations are accessible to the structure described for the synapses 112.

For the following, it is assumed that each neuron 106 is an oscillator suitable for delivering a microwave signal or signals, such as a radio frequency current $I_i^{RF} \cos(\omega_i, t)$ where $I_i^{RF}$ is the amplitude of the current and $\omega_i$ the frequency of the current. However, the considerations developed apply to the case where the oscillator delivers a stochastic or telegraphic signal with an amplitude $I_i^{RF}$ and a mean frequency $\omega_i$.

In addition, it is assumed that the oscillator is a spintronic type oscillator to ensure that a neural network 100 with a small footprint is obtained.

Example 1: Architecture with Spin Diodes

First Case of Example 1: Fixed Network

In the case illustrated, the neural network 100 is a fixed neural network.

A fixed network is a network in which training is performed offline, that is, the values of synaptic weights are determined by training another neural network, and then the neural network 100 is constructed to implement the previously determined weights.

First Embodiment (M1)

Figure 10:
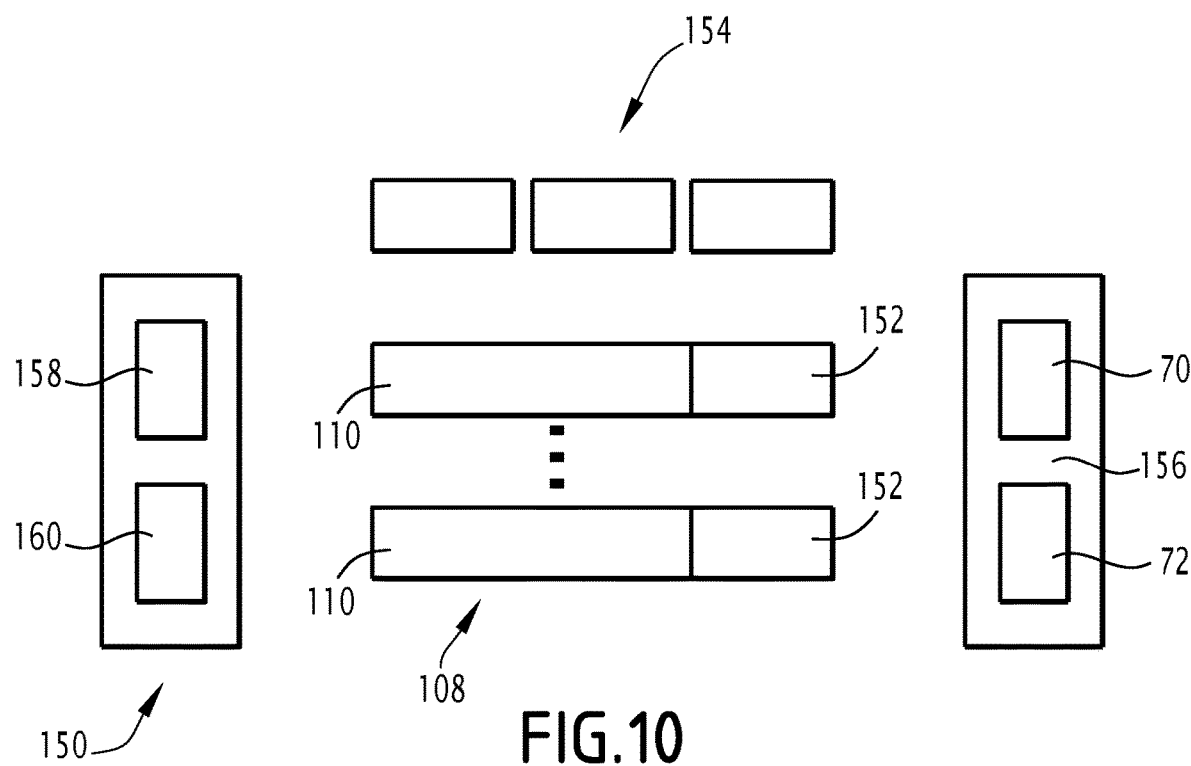
FIG. 10, a block diagram representation of an interconnection.

In addition to the set 108 of chains 110, the interconnection 104 according to FIG. 10 also includes a pre-processing circuit 150, rectification circuits 152, multiple memories 154 and a post-processing circuit 156.

The pre-processing circuit 150 is suitable for providing the interface between the upstream layer of neurons 102$^{(k)}$ and the input of chains 110.

According to the illustrated example, the pre-processing circuit 150 includes a multiplexer 158 and a radio frequency amplifier 160.

A multiplexer is a circuit for concentrating different types of signals on the same transmission chain.

An amplifier is an electronic system that increases the voltage and/or intensity of an electrical signal.

In a variant, the preprocessing circuit 150 includes only either the multiplexer 158 and the amplifier 160.

In still another embodiment, no preprocessing circuit 150 is present in the neural network 100.

The chains 110 are shown in more detail with reference to FIGS. 11 to 21.

Figure 11:
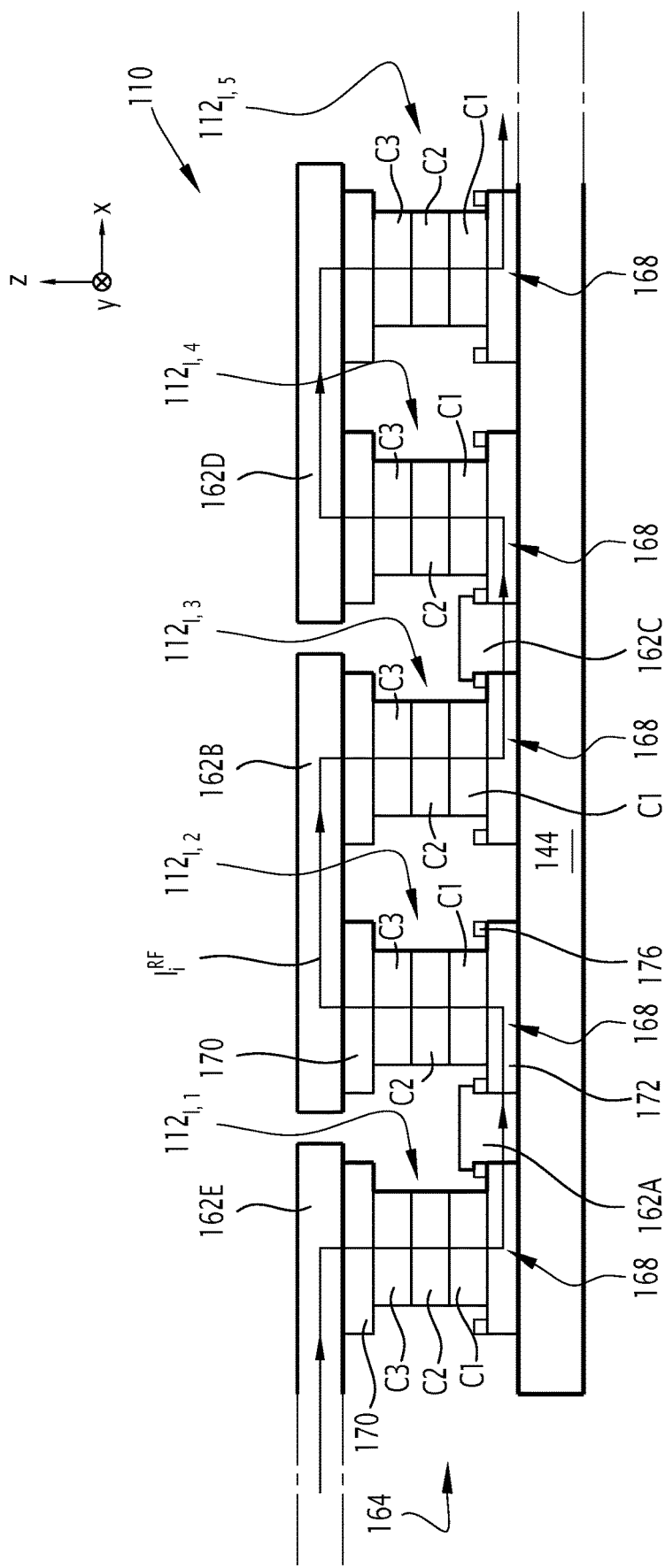
FIG. 11, a schematic representation of a part of the interconnection according to the first embodiment.

As can be seen in FIG. 11, each chain 110 has synapses 112 and at least one transmission line 162.

The synapses 112 are arranged next to each other in the first transverse direction X, the direction along which the chains 110 extend.

In the proposed example, only five synapses 112 are shown.

Each synapse 112 has a spintronic resonator 164.

A resonator is an electrical component with a resonance frequency. More precisely, the response of a resonator to a radio frequency signal is higher in a certain range around the resonance frequency.

A spintronic resonator is a magneto-resistive resonator.

More precisely, a spintronic resonator is an electrical component comprising one or more ferromagnetic layers and whose magnetization of at least one of the layers can be brought into resonant precession by a radio frequency signal. The precession of the magnetization leads to a change in the resistance of the resonator by magneto-resistive effect. The resonance frequency of the resonator depends on the dimensions of the ferromagnetic layer, the magnetic field applied to the ferromagnetic layer and the ferromagnetic material(s) forming the ferromagnetic layer.

In a variant, the magnetization dynamics of the resonator may be due to or assisted by thermal fluctuations. In this case, the resonator is said to be superparamagnetic.

For each synapse 112$_{l,m}$ an eigen resonance frequency denoted $\omega_{l,m}$ is defined.

In the case illustrated, the 112$_{l,m}$ synapses of the same chain 110 all have distinct resonance frequencies $\omega_{l,m}$ two by two.

In another variant, it is possible that some $\omega_{l,m}$ resonance frequencies are identical.

Furthermore, under the above-mentioned assumptions that the integers $N^{(k)}$, $L^{(k \to k+1)}$ and $M^{L^{(k \to k+1)}}$ are equal, within a chain 110$_1$, there is a one-to-one relationship between the synapses 112$_{l,m}$ of the chain 110$_1$ considered and the neurons 106$_i$ of the upstream layer 102$^{(k)}$. Because of this relation, for the following, it can be considered that the integer m and the integer i in this particular case are the same, the transposition in case the synapses 112$_{l,m}$ of a chain 110$_1$ are ordered differently being immediate.

Otherwise formulated, each synapse 112$_{l,i}$ of a chain 110$_l$ is able to interact with a single neuron 106$_i$ of the upstream layer 102$^{(k)}$ and the output signal $y_i$ of each neuron 106$_i$ of the upstream layer 102$^{(k)}$ interacts with a single synapse 112$_{l,i}$ of a chain 110$_l$. More precisely, a synapse 112$_{l,i}$ is able to modulate the output signal $y_i$ of the neuron 106$_i$.

The resonance frequency $\omega_{l,i}$ of the synapse 112$_{l,i}$ is then relatively close to the oscillation frequency $\omega_i$. Typically, the ratio between the resonance frequency $\omega_{l,i}$ and the oscillation frequency $\omega_i$ is less than 1%.

From the point of view of neural network 100, the modulation of the output signal $y_i$ of each neuron 106$_i$ is interpreted as a synaptic weight W.

The synaptic weight W corresponding to the modulation of the output signal $y_i$ of each i-th neuron 106$_i$ of the upstream layer 102$^{(k)}$ by the i-th synapse 112$_{l,i}$ of the l-th chain 110$_{l,i}$ is denoted $W_{i,l}$.

The synaptic weight $W_{i,l}$ is a function of the resonance frequency $\omega_{l,m}$ of the synapse 112$_{l,m}$ and the oscillation frequency $\omega_i$ of the neuron 106$_i$.

More precisely, the synaptic weight $W_{i,l}$ is written as a function f of the ratio between the resonance frequency $\omega_{l,i}$ of the synapse 112$_{l,m}$ and the oscillation frequency $\omega_i$ of the neuron 106$_i$.

The structure of a 112 synapse is described in more detail with reference to FIG. 12.

The synapse 112 comprises a stack 166 of several layers superimposed along a stacking direction, a first terminal 168 and a second terminal 170.

The stacking direction is symbolized in the Figures by the Z axis. The stacking direction is therefore referred to as the "stacking direction Z" in the rest of the description.

A first transverse direction is also defined. As can be seen in FIGS. 11 and 12, the first transverse direction is perpendicular to the stacking direction Z and contained in the plane of the sheet. The first transverse direction is symbolized in the Figures by an X axis. The first transverse direction is therefore referred to as the "first transverse direction X" in the rest of the description.

A second transverse direction is also defined as perpendicular to the stacking direction Z and the first transverse direction X. The second transverse direction is symbolized in the Figures by a Y axis. The second transverse direction is therefore referred to as the second transverse direction Y in the remainder of the description.

The stacking 166 has three layers: a first layer C1, a second layer C2 and a third layer C3.

The first layer C1 will later be referred to as the reference plot.

The first layer C1 has a magnetization, called reference magnetization.

The first layer C1 is a layer in a first material MAT1.

The first material MAT1 is a ferromagnetic material.

The first material MAT1 is, for example, an alloy of ferromagnetic transition metals (also called 3d ferromagnetic metals). As an illustration, NiFe, CoFe, CoFeB, CoNi, CoPt, FePt are such ferromagnetic transition metal alloys.

In a variant, the first material MAT1 is a Heusler alloy. A Heusler alloy is a ferromagnetic metal alloy based on a Heusler phase, an intermetallic phase of particular composition, with a face-centered cubic crystallographic structure.

According to still another variant, the first material MAT1 is a rare earth alloy. Rare earths are a group of metals with similar properties including scandium Sc, yttrium Y, and the fifteen lanthanides comprising the 15 elements ranging from lanthanum to lutetium in the periodic classification.

The second layer C2 is interposed between the first layer C1 and the third layer C3 along the stacking direction Z.

The second layer C2 is a barrier layer.

The second layer C2 is a layer made of a second material MAT2.

The second material MAT2 is a non-magnetic material.

In the case described, the second material MAT2 is a metal.

The second MAT2 material is, for example, copper (Cu), ruthenium (Ru) or gold (Au).

In such a case, synapse 112 forms a "spin valve". A spin valve is a component, consisting of two or more layers of magnetically conductive materials, whose electrical resistance can be changed between several values depending on the relative angle between the magnetizations of the layers.

The third layer C3 will be referred to later as the resonance pad.

The third layer C3 has a magnetization.

The third layer C3 is a layer of a third material MAT3.

The third material MAT3 is a ferromagnetic material.

The same examples as for the first material MAT1 are also valid for the third material MAT3.

According to the cases envisaged, the first material MAT1 and the third material MAT3 are distinct or identical.

In a variant, the stack 166 has additional layers as described in the case of oscillators.

As an example, it is possible that the first layer C1 comprises two ferromagnetic layers coupled by exchange coupling and biased by an antiferromagnetic layer, known by the person skilled in the art as "synthetic antiferromagnetic" (SAF).

According to another example, one or more layers C1, C2 and C3 of the stack 166 has a structure with multiple layers for the growth needs of layers C1, C2 and C3 to be formed.

The first terminal 168 has a base 172, a first electrical contact 174 and a second electrical contact 176.

According to the example described, the base 172 is in contact with the first layer C1.

In the case where additional layers are present, there is no more physical contact but the first layer C1 is connected to the base 172.

Each electrical contact 174 and 176 is arranged at a respective end of the base 172, on either side of the stack 166 of layers in the first transverse direction X.

The second terminal 170 is connected to the third layer C3.

Figure 12:
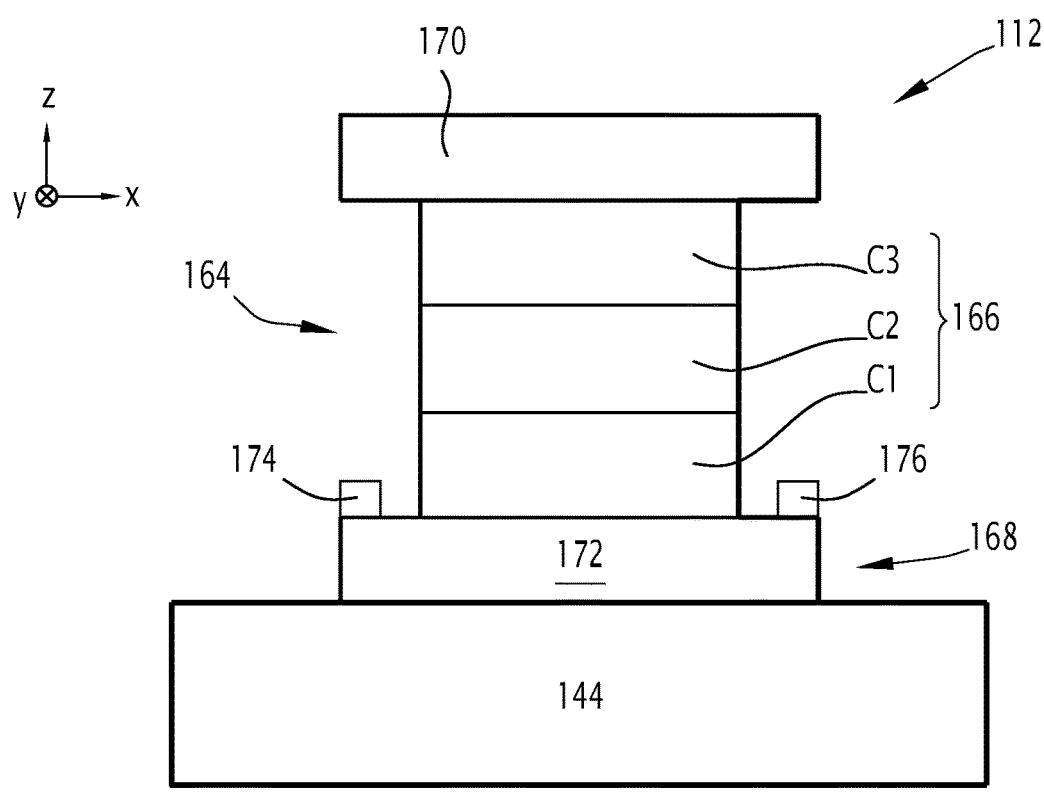
FIG. 12, a schematic representation of an example of a resonator of the interconnection according to the first embodiment.

In the case of FIG. 12, the resonator 164 is according to a geometry known as CCP, that is, the current feeding the resonator 164 is injected perpendicularly to layers C1, C2 and C3.

In FIG. 11, the electrical connection between the different synapses 112 is a specific serial connection which will be called an alternating connection in the following.

The set of electrical connections between the different synapses 112 forms the transmission line 162.

From left to right of FIG. 11, the terminal 168 of the first synapse $112_{1,1}$ is connected to the terminal 168 of the second synapse $112_{1,2}$ by a first portion 162A of the transmission line 162; the terminal 170 of the second synapse $112_{1,2}$ is connected to the terminal 170 of the third synapse $112_{1,2}$ by a second portion 162B of the transmission line 162; the terminal 168 of the third synapse $112_{1,3}$ is connected to the terminal 168 of the fourth synapse $112_{1,4}$ by a third portion 162C of the transmission line 162, and the terminal 170 of the fourth synapse $112_{1,4}$ is connected to the terminal 170 of the fifth synapse $112_{1,5}$ by a fourth portion 162D of the transmission line 162.

Together, each portion 162A, 162B, 162C, and 162D forms the transmission line 162. In the example shown, the transmission line 162 also has an additional portion 162E. The first additional portion 162E is connected to the terminal 170 of the first synapse $112_{1,1}$.

The connection is alternate in that a synapse 112 located between two synapses 112 is connected to the downstream synapse 112 by a portion of line connecting the first terminals 168 while the synapse 112 under consideration is also connected to the upstream synapse 112 by a portion of line connecting the second terminals 170. An alternation of terminals 168 or 170 is indeed present.

In such an example, the synapse 112 is also suitable for rectifying a portion of the radio frequency signal passing through the transmission line 162, so that the rectification circuit 152 and the synapse 112 are confused.

From a functional point of view, the transmission line 162 thus has a dual role: injection of the radiofrequency current coming from the previous neuron layer and collection of the sum of the voltages rectified by the synapses 112 in the chain.

The memories 154 are spintronic memories.

Preferably, the memories 154 are assemblies of layers having the same structure as the synapses 112.

In particular, ST-MRAM (Spin-torque Magnetic Random Access Memories) are based on magnetic tunnel junctions. Such memories are compatible with resonators based on spin valves and magnetic tunnel junctions and can be used to achieve the memories 154.

The post-processing circuit 156 is suitable for providing the interface between the output of strings 110 and the downstream neuron layer $102^{(k+1)}$.

According to the example shown, the post-processing circuit 156 includes a spintronic memory 70 and a continuous signal amplifier 72.

In a variant, the post-processing circuit 156 has only one of spintronics memory 70 and amplifier 72.

According to still another embodiment, no post-processing circuit 156 is present in the neural network 100.

In operation, the radiofrequency current (multiplexed and amplified in the case described) coming from the neurons 106 is applied to the synapses 112 simultaneously by direct injection through the transmission line 162. In this implementation, this is equivalent to directly injecting the radiofrequency current through the resonator 164.

When a radio frequency current $I_i^{RF} \cos(\omega_i \cdot t)$ is applied to a resonator 164 implementing a synapse $112_{l,m}$, the combination of the effects of spin transfer, spin-orbit couples (spin Hall effect or Rashba effect) and of fields created by the current will lead to a precession of the magnetization of the third layer C3.

In a variant, the precession of the third layer C3 may be due to spin waves emitted by neurons of the previous layer.

In a variant, the dynamics of the third layer C3 may be due to thermal fluctuations if the resonator is superparamagnetic. The following description describes the case of harmonic resonators but the derivation in the case of superparamagnetic resonators is immediate.

In addition, it should be noted that each resonator 164 can operate according to one of the magnetic configurations illustrated in FIGS. 13 to 18, and thus in particular according to configurations with vortex. This observation applies to all the structures that will be described in the rest of the application.

The amplitude of the precession is all the greater as the amplitude of the radio frequency current $I_i^{RF}$ is high and the frequency $\omega_i$ is close to the resonance frequency $\omega_{l,m}$ of the third layer C3.

In the linear regime of low perturbations, the amplitude of the oscillation $\theta$ of the precession is proportional to the radiofrequency current.

As the resonator 164 is a magneto-resistive element, the resistance of the resonator 164 depends directly on the amplitude of the oscillation $\theta$ of the precession of the magnetization. As a result, the resistance of resonator 164 also oscillates.

Since the injected radio frequency current and the resistance of resonator 164 oscillate at the same frequency (or at close frequencies), a direct voltage (that is, rectified) appears between the two terminals of the resonator 164. This phenomenon is called a spin diode.

It should be noted that when the spin diode effect is used in the context of a detection method, the spin diode effect is sometimes referred to as spin transfer induced ferromagnetic resonance (better known as ST-FMR).

The rectified voltage between the two terminals of the resonator 164 is expressed as:

$$V_{DC}^i = \frac{1}{2}\frac{\partial^2 V}{\partial I^2}(I_i^{RF})^2 + \frac{\partial^2 V}{\partial\theta\partial I}\langle I_i^{RF}(t)\theta(t)\rangle$$

The first term $$\frac{1}{2}\frac{\partial^2 V}{\partial I^2}(I_i^{RF})^2$$

corresponds to a purely electrical contribution while the second term $$\frac{\partial^2 V}{\partial\theta\partial I}\langle I_i^{RF}(t)\theta(t)\rangle$$

is the term of spin diode.

The term spin diode is proportional to $(I_i^{RF})^2$.

Moreover, the spin diode term is a weighted sum of a Lorentzian and an anti-Lorentzian component corresponding to the variations of the amplitude of the oscillation of the magnetization $\theta$ either in phase or in phase quadrature with the radio frequency current $I_i^{RF}(t)$.

A Lorentzian function $L(\omega_0, \omega)$ is defined by:

$$L(\omega_0, \omega) = \frac{\omega^2}{(\omega_0^2 - \omega^2)^2 + (\Delta\omega)^2}$$

An anti-Lorentzian function $L'(\omega_0, \omega)$ is defined by:

$$L'(\omega_0, \omega) = \frac{(\omega_0^2 - \omega^2)^2}{(\omega_0^2 - \omega^2)^2 + (\Delta\omega)^2}$$

In these expressions, $\omega_0$ is the resonance frequency and $\Delta$ is the bandwidth of the resonator, corresponding to the width of the frequency band in which the resonator response is high.

The anti-Lorentzian component of the spin diode term is preponderant over the Lorentzian component when the radio frequency current $I_i^{RF}$ (t) generates a magnetic field. In the described structure, a magnetic field is generated by the radiofrequency current (Oersted field) and by the spin transfer torque.

The anti-Lorentzian component is preferentially used to obtain the synaptic weight of the synapse $112_{l,m}$ because, when the resonance frequency of the resonator $\omega_{l,m}$ and the frequency of the corresponding neuron $\omega_i$ are close, the Lorentzian component of the rectified voltage is proportional to the term $(\omega_i-\omega_{l,m})$.

As a result, it is possible to obtain at the terminals of the resonator 164 corresponding to the synapse $112_{l,m}$ a positive or negative rectified voltage proportional to $(I_i^{RF})^2$ and proportional to $(\omega_i-\omega_{l,m})$, corresponding to a positive or negative synaptic weight.

The alternating series connection of the resonators 164 in the chain $110_l$ makes it possible to sum the rectified voltages corresponding to the spin diode terms of each synapse in the chain, while largely eliminating purely electrical terms such as $$\frac{1}{2}\frac{\partial^2 V}{\partial I^2}(I_i^{RF})^2.$$

Thus, the voltage at the terminals of the transmission line 162 running through the entire chain 110$_1$ is proportional to the sum of the squares of the radiofrequency signals coming from neurons the 106$^{(k-1)}$ of the previous layer weighted by the difference between the frequencies of the 106(k) neurons and the synapses 112$_{l,m}$ of the chain. The resulting voltage can then be sent to the post-processing circuit 156 and fed to the neuron 106$^{(k+1)}$, which corresponds to making the inference.

It should be noted that, preferably, the neural network 100 is suitable for implementing a technique for compensating the decrease with the frequency of the amplitude of the resonance.

For example, compensation is implemented by the amplifiers (first technique), by choosing a specific geometry of the transmission line 162 (second technique) or by a judicious choice of the order of the resonators 164 on the transmission line 162 (third technique). The judicious choice is to order the resonators 164 according to a decreasing frequency.

In such an embodiment, each 106 neuron and each synapse 112 respectively occupies a limited space, typically less than 100×100 nm$^2$ for each 106 neuron and each synapse 112. As a result, the neural network 100 has a larger number of neuron 106 and synapse 112 compared to known state of the art neural networks. This results in a neural network 100 with improved performance compared to known state of the art neural networks.

In particular, the proposed implementation makes it possible to achieve a neural network 100 which is a deep and fixed neural network.

Figure 19:
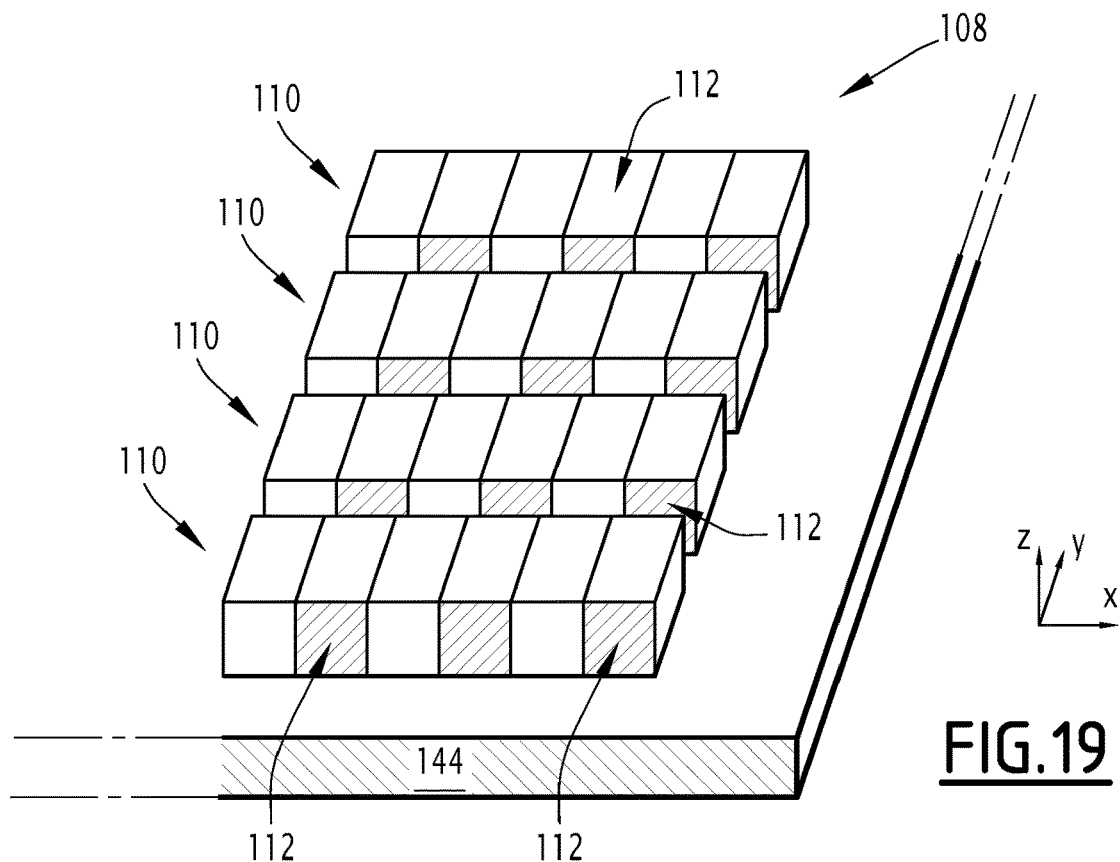
FIG. 19, a first example of the structure of an interconnection according to the first embodiment.
Figure 20:
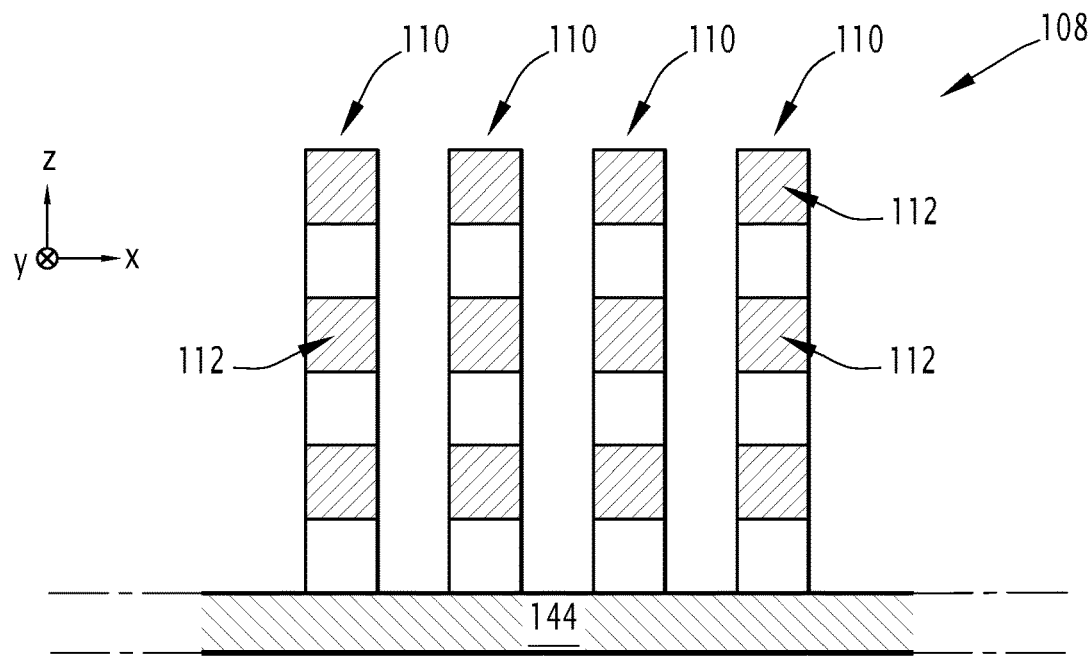
FIG. 20, a second example of the structure of an interconnection according to the first embodiment.
Figure 21:
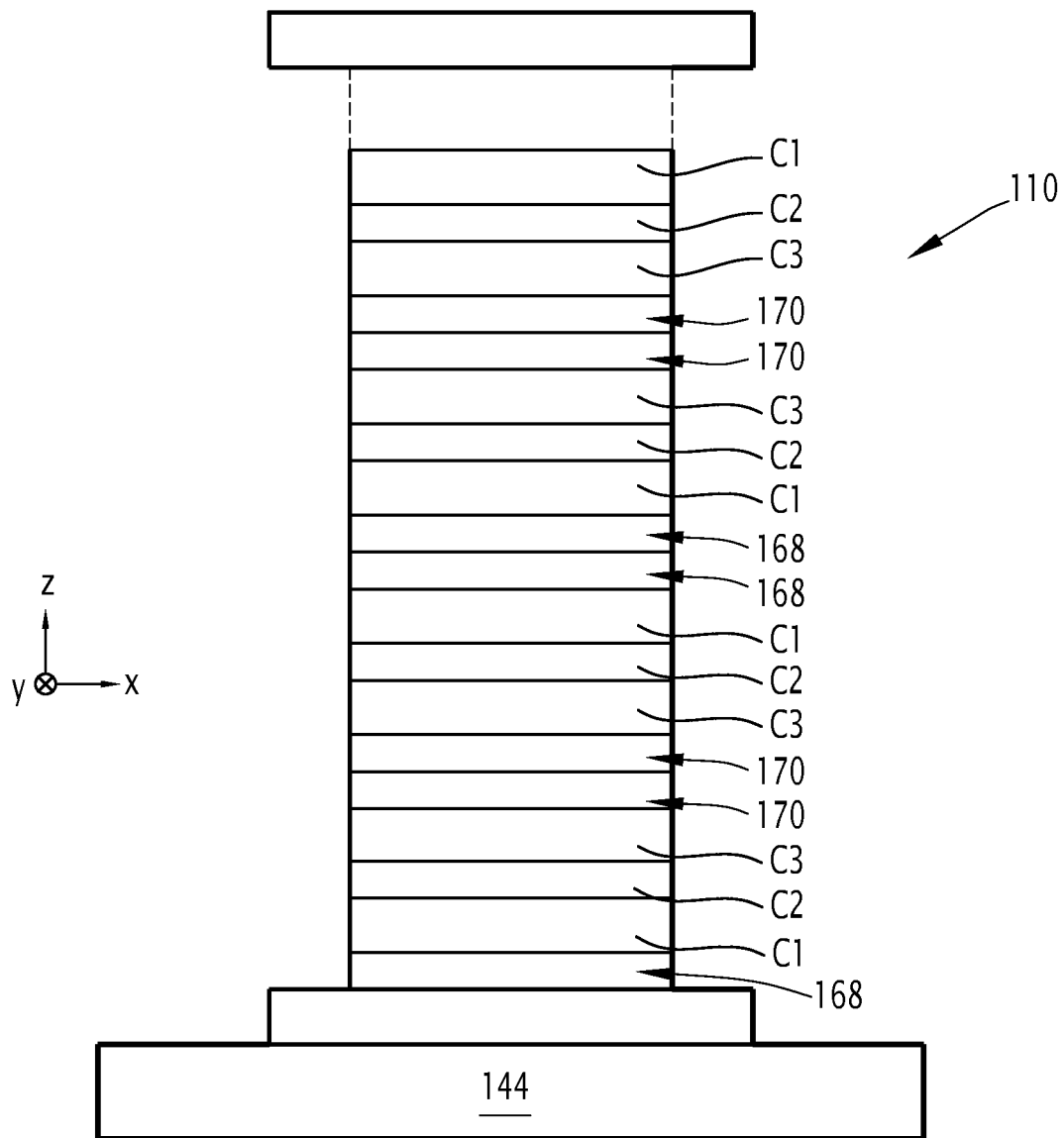
FIG. 21, a third example of the structure of an interconnection according to the first embodiment.

Moreover, it is easy to fabricate such structures since horizontal or vertical configurations are possible as shown schematically in FIGS. 19 and 20. For example, a vertical chain with alternating series connection of the resonators is shown schematically in FIG. 21 (alternative to the horizontal connection in FIG. 11).

In particular, the production of metal-layer spin valves is particularly easy.

In addition, due to the metallic character, the resistance of each resonator 164 is relatively low. This means that it is possible to place many resonators 164 in series in the transmission line 162 without the resonators 164 inducing too strong an attenuation of the radiofrequency signal that is injected into the transmission line 162.

Second Embodiment(M2)

The neural network 100 according to the embodiment M2 is described by comparison with the neural network 100 according to the embodiment M1.

This means that the same remarks as for the elements of the neural network 100 according to the embodiment M1 apply to the elements of the neural network 100 according to the embodiment M2. For the sake of simplification, these remarks are not repeated in the following.

Similarly, the operation of the neural network 100 in the embodiment M2 is similar to the operation of the neural network 100 according to the embodiment M1. This means that the same remarks as for the operation of the neural network 100 according to the embodiment M1 apply to the operation of the neural network 100 according to the embodiment M2. For the sake of simplification, these remarks are not repeated in the following.

In addition, the benefits of the neural network 100 according to the embodiment M2 are similar to the benefits of the neural network 100 according to the embodiment M1. This means that the same remarks as for the benefits of the neural network 100 according to the embodiment M1 apply to the benefits of the neural network 100 according to the embodiment M2. For the sake of simplification, these remarks are not repeated in what follows.

Only the differences in structure, function and benefits have been highlighted.

In what follows, such a situation where two neural networks 100 according to two MX and MY embodiments are similar will be highlighted by the single sentence "The MX embodiment MX is described by comparison with the MY embodiment".

In this case, the embodiment M2 is described by comparison with the embodiment M1.

Figure 22:
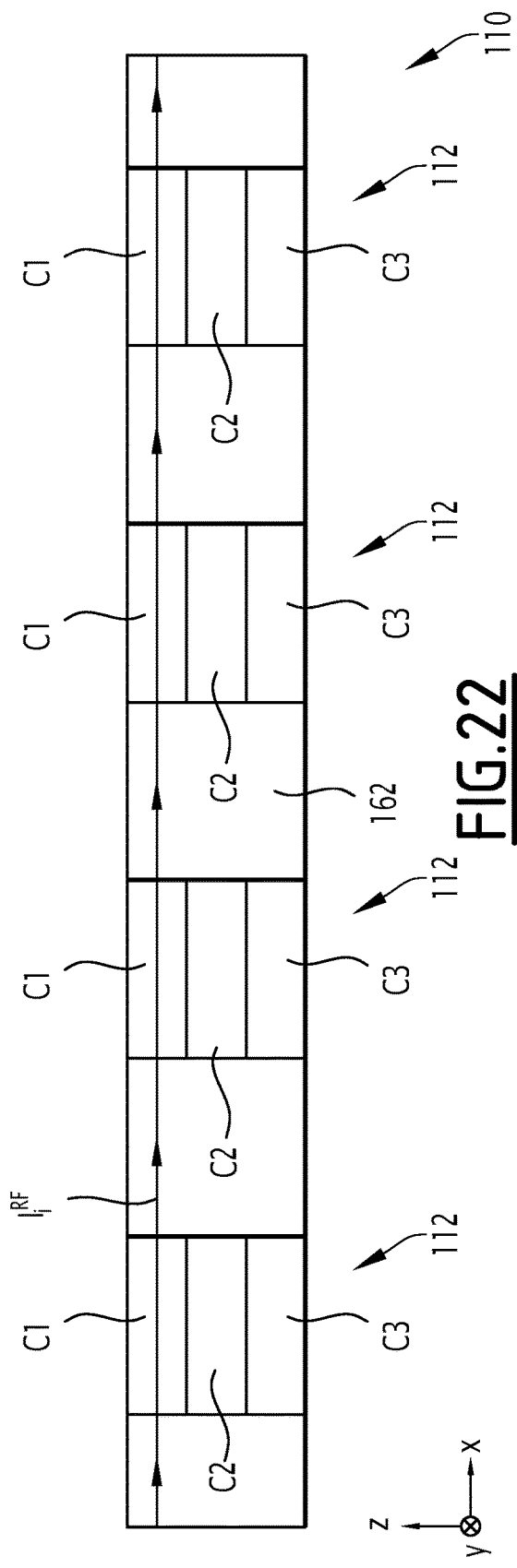
FIG. 22, a schematic representation of a first example of a part of the interconnection according to a second embodiment.
Figure 23:
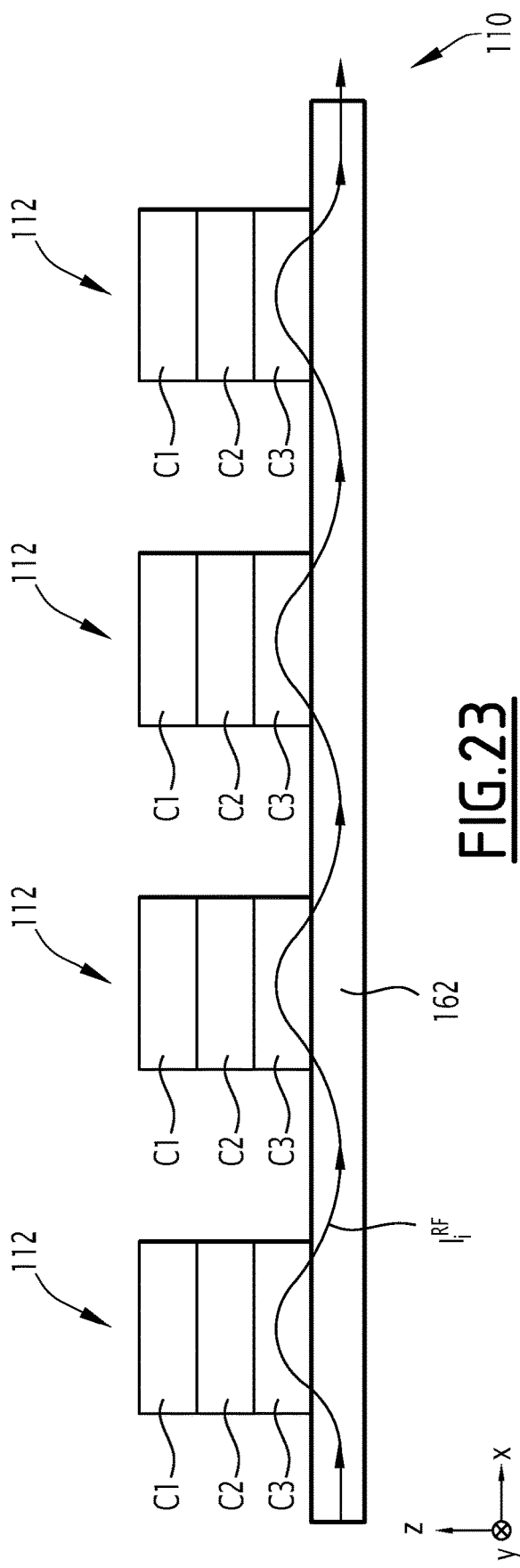
FIG. 23, a schematic representation of a second example of a part of the interconnection according to a second embodiment.

With reference to FIGS. 22 and 23, the resonator 164 according to the embodiment M2 is in a CIP configuration, that is, the current is injected in the plane of layers C1, C2 and C3.

The second material MAT2 is a metal.

In such a case, the two electrical contacts 174 and 176 are attached to the third layer C3.

The neural network 100 according to the embodiment M2 has the advantage of being easier to achieve than the neural network according to the embodiment M1.

Third Embodiment (M3)

The embodiment M3 is described by comparison with the embodiment M1.

Figure 24:
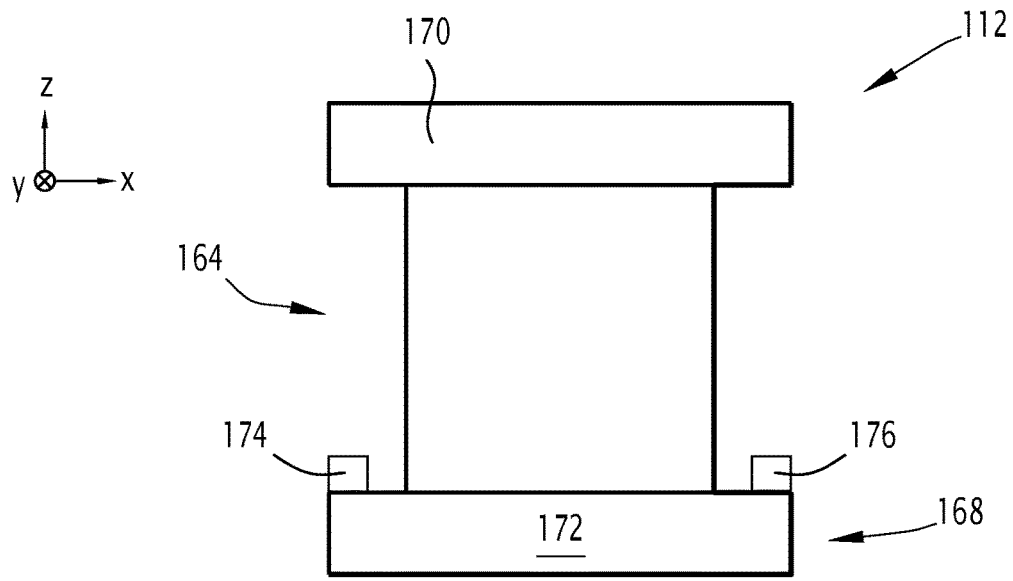
FIG. 24, a schematic representation of an example of a resonator of the interconnection according to a third embodiment.

As shown in FIG. 24, the resonator 164 according to the embodiment M3 is formed of a single layer C3 instead of the three layers C1, C2 and C3.

The single layer is a layer made of a magnetic material.

In such a structure, the operation of the synapse 112 relies on the anisotropic magneto-resistance effect.

In a single magnetic layer, the anisotropic magneto-resistance qualifies the variations in resistance as a function of the angle that the magnetization makes with the direction of the injected current.

The neural network 100 according to the embodiment M3 has the advantage of being very easy to achieve.

Fourth Embodiment (M4)

The embodiment M4 is described by comparison with the embodiment M1.

According to the example of the embodiment M4, the second material MAT2 is an insulator.

In this case, the resonator 164 is a magnetic tunnel junction.

As a special example, the second MAT2 material is magnesium oxide (MgO), aluminum oxide ($Al_2O_3$), lead titano-zirconate (PZT), bismuth ferrite (BiFeO3), barium titanate ($BaTiO_3$) or hafnium oxide (HfOx).

The operation of a magnetic tunnel junction in this case is similar to the operation of a spin valve so that the operation and advantages of the embodiment M4 are identical to the operation and advantages of the embodiment M1.

In such a case, it is possible to obtain higher values for the rectified signal (greater spin diode effect), thus reducing the amplification requirements.

In addition, the magnetic tunnel junctions are compatible with STT-MRAM spintronic memories.

Fifth Embodiment (M5)

The embodiment M5 is described by comparison with the embodiment M1.

In the embodiment M5, the RF current from the neurons 106 is injected into an antenna or a field line 182 placed close to the resonator 164.

Figure 25:
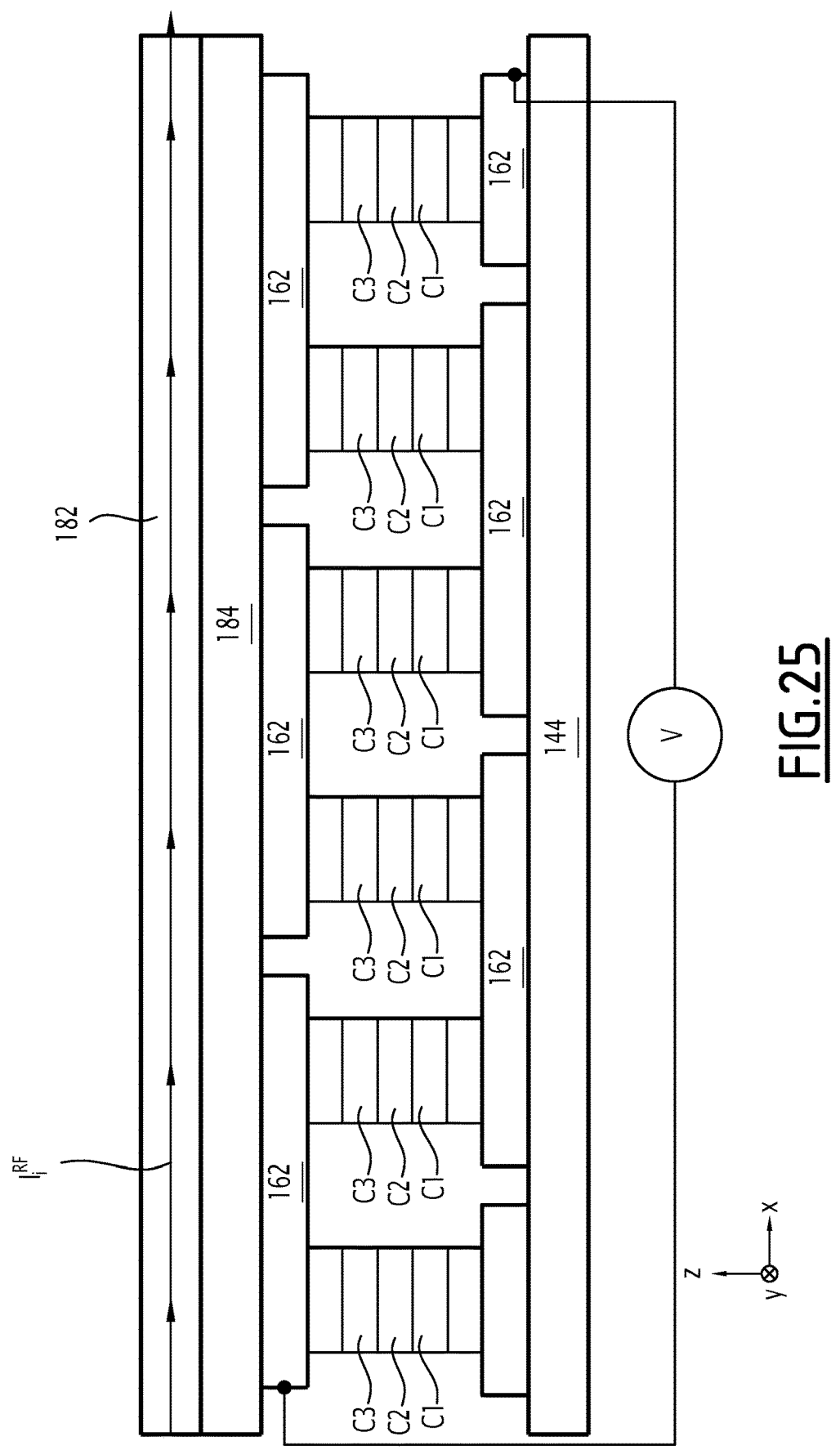
FIG. 25, a schematic representation of an example of a part of the interconnection according to a fifth embodiment.

According to the example shown in FIG. 25, the antenna or field line 182 forms a transmission line in contact with an intermediate layer 184. The intermediate layer 184 is in contact with the second terminal 170, which is an electrical insulator such as SiO2, SiC, SiN or AlOx.

In such a case, the transmission line 162 only plays the role of reading (collecting) the rectified voltages from the resonators 164.

In the case illustrated, the resonator 164 is either the resonator 164 of the first structure (spin valve in CPP configuration, that is, the current is injected perpendicular to the plane of layers C1, C2 and C3) or a magnetic tunnel junction, or a spin valve in CIP configuration.

In operation, the resonator 164 is strongly coupled to the antenna 182 by capacitive effect so that a strong radiofrequency current is generated in the resonator 164.

In the embodiment M5, this prevents any attenuation of the RF signal due to the series resonators in the transmission line 162 and there is good decoupling of the RF signals fed into the antenna 182 from the rectified signals measured in the transmission line 162.

Second Case of Example 1: Binary Reconfigurable Network

In the case illustrated, the neural network 100 is a binary reconfigurable neural network. A binary reconfigurable neural network 100 is a network suitable for reconfiguring weights on only two values. Reconfiguring a network allows the network to perform different tasks.

Sixth Embodiment (M6)

The embodiment M6 is described by comparison with the embodiment M1.

Figure 26:
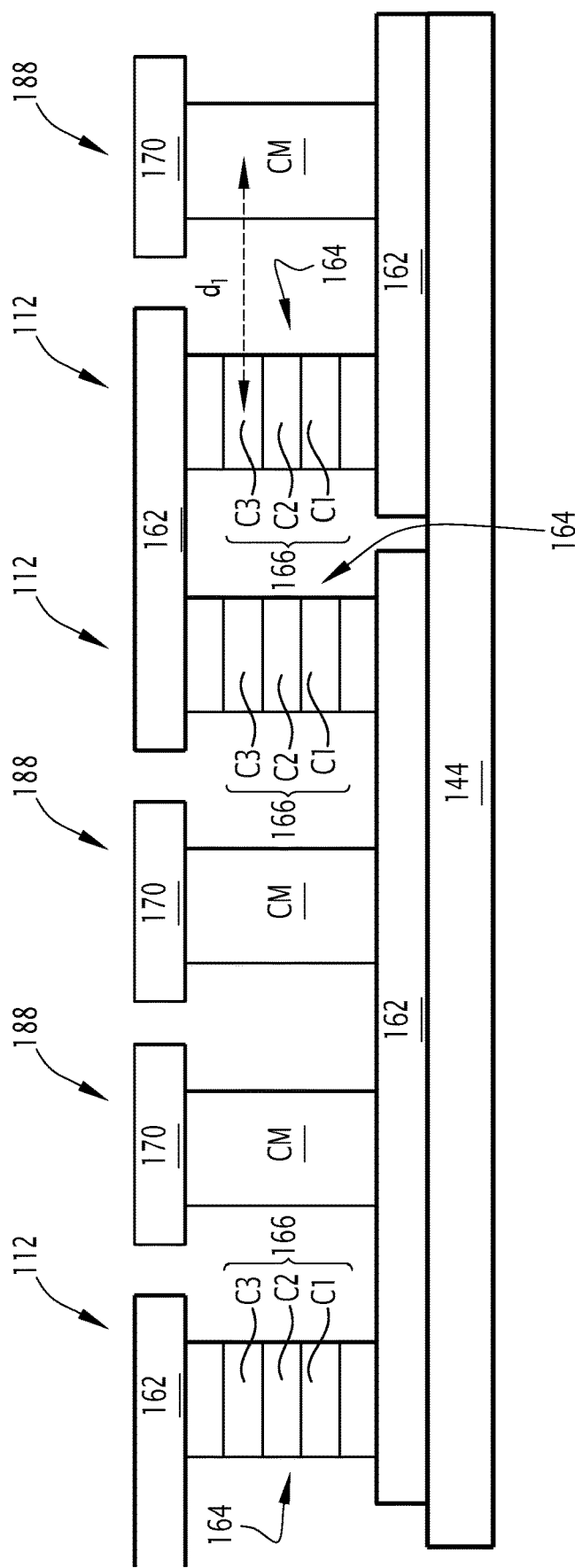
FIG. 26, a schematic representation of an example of a part of the interconnection according to a sixth embodiment.

The embodiment M6 is shown in FIG. 26.

It is assumed that the resonators 164 have a uniform magnetization, the transposition in the case of vortex magnetization being immediate.

Each synapse 112 has a resonance frequency adjustment element 188.

The adjustment element 188 is suitable for generating a magnetic field on the resonator 164.

More precisely, the magnetic field that the adjustment element 188 is suitable for generating is along the axis of magnetization.

The adjustment element 188 has a stack 166 of layers in the stacking direction Z, a first terminal 168 and a second terminal 170.

Stack 166 has at least one CM ferromagnetic layer.

The CM ferromagnetic layer of the adjustment element 188 will be referred to as "control pad" in the following.

The first terminal 168 of the adjustment element 188 is confused with a portion 162A connecting two first terminals 168 of a portion of transmission line 162.

The second terminal 170 of the adjustment element 188 is similar to the second terminal 170 of the resonator 164 of the first structure in the first example. Therefore, the same remarks apply to stack 166 of the adjustment element 188 and are not repeated here.

The second terminal 170 is not connected to any portion of the transmission line 162.

The distance between the third layer C3 of the stack 166 of the resonator 164 and the ferromagnetic layer CM defined as the distance between the centers of gravity of the two layers along the first transverse direction X is called the first distance d1.

In operation, at a synapse 112, the adjustment element 188 generates a magnetic field on the resonator 164.

The magnetic field applied to the stack 166 of the resonator 164 depends on the first distance d1, the magnetization of the adjustment element 188 and the geometry of the adjustment element 188.

The magnetization of the adjustment element 188 is changed by spin transfer by injecting current pulses between the two terminals 168 and 170 of the adjustment element.

As in the case of embodiment M1, the magnetization of the resonator 164 is fixed. Due to the positioning of the adjustment element 188, the magnetization of the ferromagnetic layer CM of the resonator 164 does not see the same magnetic field profile in the direction that the magnetization of the third layer C3 of the resonator 164 takes with respect to the first transverse direction X.

This results in the resonator 164 having two different resonance frequencies $\omega_{l,m,1}$ and $W_{l,m,2}$. These two resonance frequencies correspond to two different values of the synaptic weight of the synapse $112_{l,m}$.

In a variant, the magnetization of the adjustment element 188 is modified by spin transfer and injection of a radiofrequency current at the resonance frequency of the ferromagnetic layer CM between terminals 168 and 170.

Similar to the previous operation, two different resonance frequencies $\omega_{l,m,1}$ and $\omega_{l,m,2}$ of the resonator 164 are obtained.

In this case, it should be noted that once the magnetization of the adjustment element 188 has been changed, the RF current is cut off because the magnetization of the adjustment element 188 is in the equilibrium position.

According to another embodiment, the adjustment element 188 is supplied with current through the second terminal 170 so as to generate a spin Hall effect resulting by spin transfer in a change of the orientation of the magnetization of the ferromagnetic layer CM.

In each embodiment, it should be denoted that once the orientation of the magnetization is switched, the load current supplied to the adjustment element 188 can be switched off, the magnetization being in an equilibrium position.

Seventh Embodiment (M7)

The embodiment M7 is described in contrast to the embodiment M6.

Figure 27:
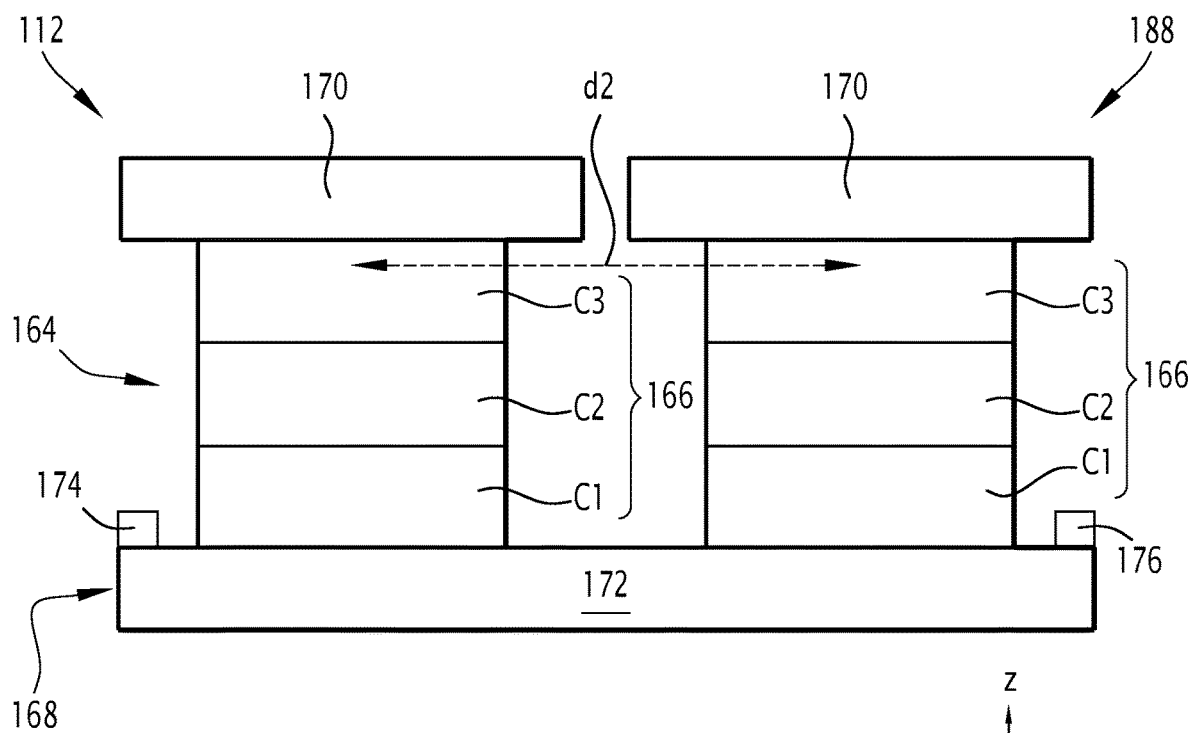
FIG. 27, a schematic representation of an example of a resonator and adjustment pad of the interconnection according to a seventh embodiment.

The embodiment M7 is shown in FIG. 27.

In the case of the embodiment M7, stack 166 of the adjustment element 188 is similar to the stack 166 of the resonator 164 of the embodiment M1 or the embodiment M5.

Preferably, for ease of fabrication, the materials of the layers of stack 166 of the adjustment element 188 are identical to the materials of the stack 166 of the resonator 164.

The third layer C3 of the adjustment element 188 is often referred to as the "control pad".

The first terminal 168 of the adjuster 188 is confused with a portion 162A connecting two first terminals 168 of a portion of the transmission line 162.

The second terminal 170 of the adjustment element 188 is similar to the second terminal 170 of the resonator 164 of the first structure in the first example. Therefore, the same remarks apply for stack 166 of the adjustment element 188 and are not repeated here.

The second terminal 170 is not connected to any portion of the transmission line 162.

Preferably, the third layer C3 of the adjustment element 188 is arranged opposite the third layer C3 of the resonator 164.

The distance between the two layers C3 defined as the distance between the centers of gravity of the two layers along the first transverse direction X is called the second distance d2.

Eighth Embodiment (M8)

The embodiment M8 is described by comparison with the embodiment M6.

Figure 28:
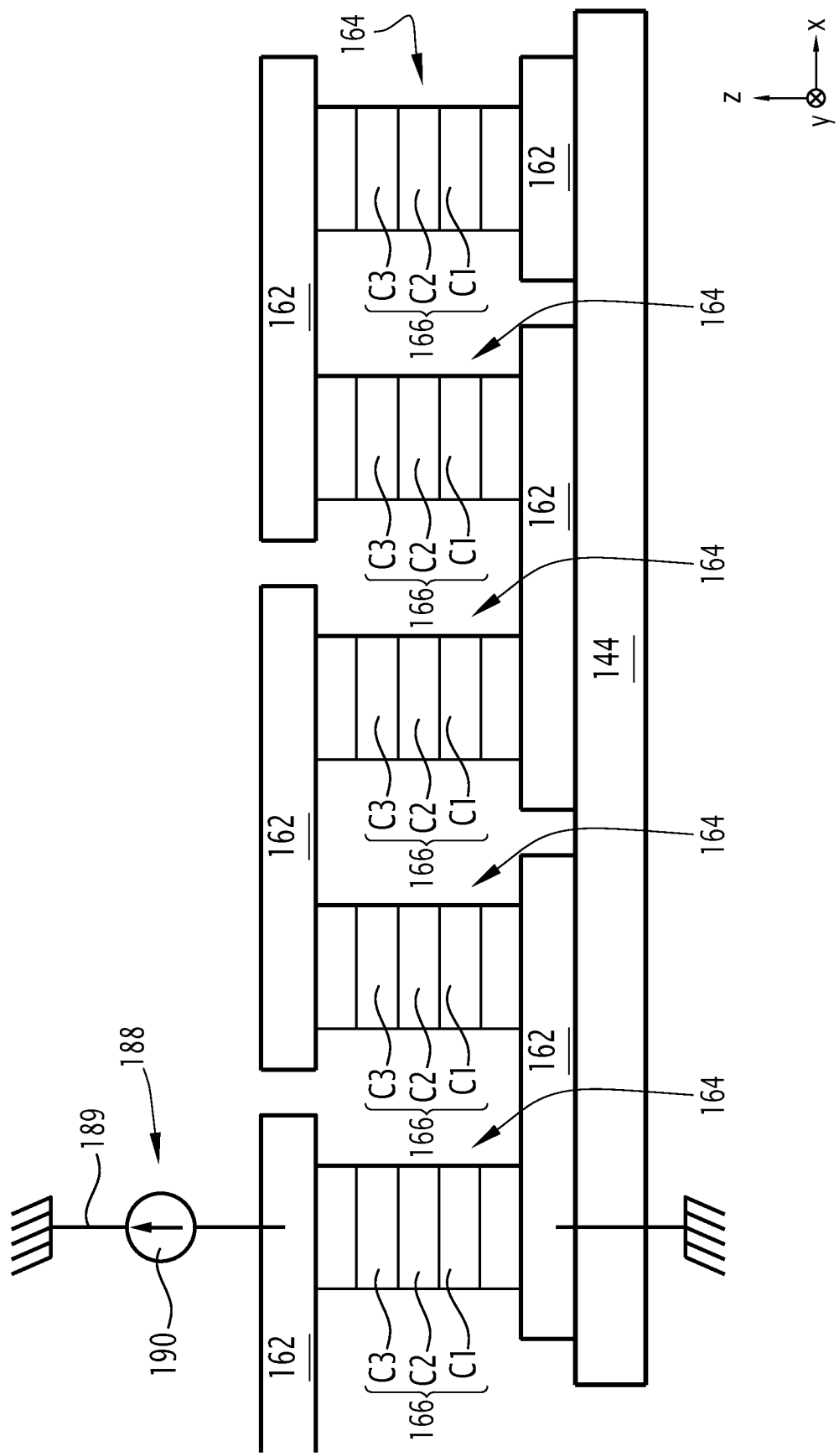
FIG. 28, a schematic representation of an example of a part of the interconnection according to an eighth embodiment.

The embodiment M8 is shown in FIG. 28.

In the case of the embodiment M8, the resonator 164 is the resonator 164 of the M1, M2, M3 or embodiment M4s. Each resonator 164 has an adjustment element 188.

In addition, the adjustment element 188 is a link set 189 and a current or voltage generator 190.

Each link 189 is a specific link to a resonator 164.

During operation, the generator 190 applies current or voltage sequences allowing to modify the orientation of the magnetization of the third layer C3 by spin transfer or spin Hall effect.

Since the reference pad C1 generates a magnetic field on the resonant pad C3, this results in two resonance frequencies for each resonator 164.

In addition, it should be noted that the current can then be switched off because the magnetization is then in the equilibrium position.

The embodiment M8 is easier to achieve than the embodiments M6 and M7.

When there is not an individual access to each resonator 164, it is nevertheless possible to selectively reverse the magnetization of a specific resonator 164 by adding to the pulse that generates the spin transfer or the spin Hall effect a radiofrequency current at the resonance frequency $\omega_{l,m}$ of the resonator 164.

Third Case of Example 1: Network Suitable for Learning

Ninth Embodiment (M9)

In the case illustrated, the neural network 100 is a neural network suitable for learning by a quasi-continuous variation of the value of its weights.

The embodiment M9 is described by comparison with the embodiment M1.

Figure 29:
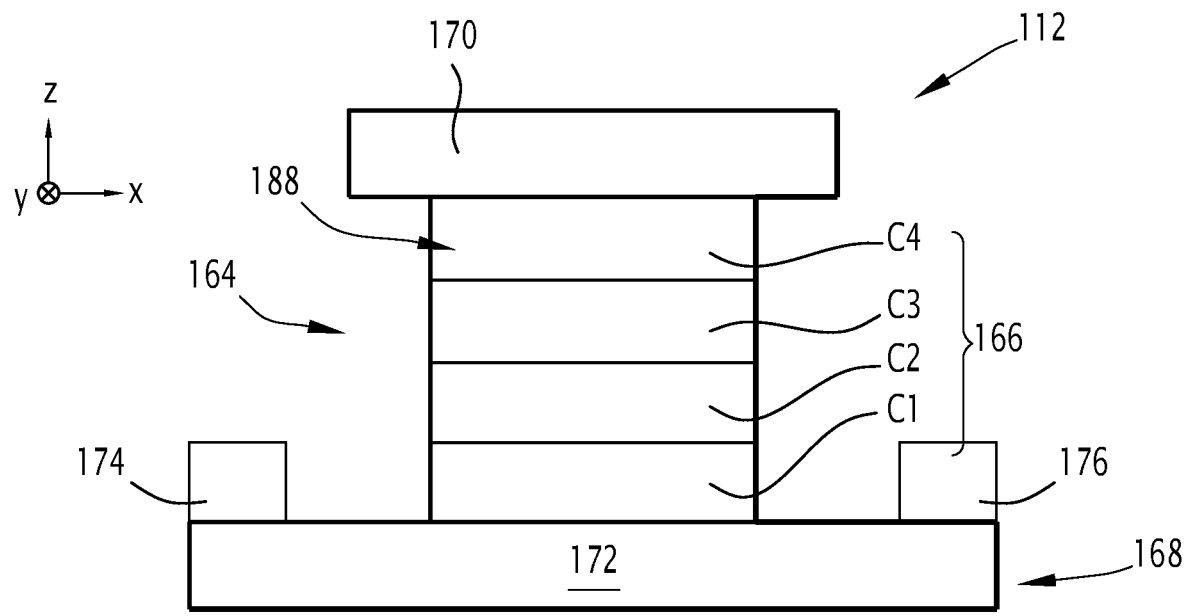
FIG. 29, a schematic representation of an example of a resonator of the interconnection according to a ninth embodiment.

The embodiment M9 is illustrated in FIG. 29.

According to the example shown, the adjustment element 188 is a fourth layer C4.

The fourth layer C4 is part of stack 166 of a synapse 112.

In a variant, the fourth layer C4 is placed close to the third layer C3 of the adjustment element 188, at a distance such that the fourth layer C4 influences the magnetization of the third layer C3 of the synapse 112.

The fourth layer C4 is made of a fourth MAT4 material with a property that can be controlled by applying an electrical voltage or an electrical current to the fourth layer C4.

For the following, it is assumed that the property depends on the electrical voltage applied to the fourth layer C4.

The property is, for example, a ferroelectric property or a magnetic property or a mechanical property or a structural property.

The variation of the property under the effect of voltage or current can result from a phenomenon of oxygen gap migration. In such a case, the fourth layer C4 has a certain degree of oxidation involving the presence of oxygen ions. The application of an electric field causes the displacement of oxygen ions due to their charge. This displacement is a migration. The migration effect is all the stronger at the interface between the third layer C3 and the fourth layer C4 where the electric field is increased due to the symmetry break. As the so-called interface magnetic anisotropy is very dependent on the oxygen at the interface, it becomes possible to vary the magnetic anisotropy, and thus the resonance frequency of the third layer C3 by modifying the oxygen content of the interface between the third layer C3 and the fourth layer C4 by applying an electric field to the fourth layer C4.

In a variant, the variation of the property under the effect of voltage or current may result from a phenomenon of creation of conductive filaments by ion or atomic diffusion. After applying a strong electric field to the fourth layer C4, ion or atomic migrations may occur. In such a case, the migrations propagate in the form of filaments (and not as a diffusion front). Depending on the value of the amplitude of the applied electric field, the filaments generate a more or less conductive bridge between the third layer C3 and the fourth layer C4. This results in a local modification of the space charge at the interface between the third layer C3 and the fourth layer C4 which modifies, on average, the interface magnetic anisotropy of the third layer C3.

According to another embodiment, the variation of the property under the effect of voltage or current results from a modification of the configuration of the electrical polarization.

In a variant, the variation of the property under the effect of voltage or current is generated by a modification of the configuration of the atomic mesh.

In still another embodiment, the variation of the property under the effect of voltage or current results from a phenomenon of modification of the crystallinity. In this case, the application of an electric field creates a current able to melt the material towards an amorphous phase (disorder of the atomic mesh) or on the contrary to make it return to a crystalline configuration (order of the atomic mesh). This leads to mechanical stresses on the third layer C3 which can change both the amplitude of magnetization and the magnetic anisotropy of the interface.

In summary, the fourth material MAT4 has a property that can be controlled by applying an electrical voltage or an electrical current to the fourth layer C4. The variation of the property under the effect of the voltage or current can result from at least one of the following phenomena: migration of oxygen gaps, creation of conductive filaments by ion or atomic diffusion, modification of the configuration of the electrical polarization, modification of the configuration of the atomic lattice, and modification of the crystallinity.

An example of such a fourth MAT4 material is an insulating oxide.

Examples of insulating oxides are $TiO_x$, $TaO_x$, $AlO_x$ and $HfO_x$.

In another example, the fourth material MAT4 is a ferroelectric and piezoelectric material.

PZT, $BiFeO_3$, $BaTiO_3$ are examples of ferroelectric and piezoelectric materials.

In a variant, the fourth material MAT4 is a phase change material.

$VO_2$, $V_2O_3$ or a chalcogenide such as GeSbTe alloy can be mentioned.

During operation, a voltage pulse is applied to the fourth layer C4.

This causes a change in the property of the fourth layer C4 causing a change in the magnetization or magnetic anisotropy of the third layer C3.

The modification of the magnetic anisotropy of the third layer C3 makes it possible to change the resonance frequency $\omega_{l,m}$ of the synapse $112_{l,m}$.

The modification of the characteristics (duration and/or amplitude) of the voltage thus makes it possible to change the value of the resonance frequency $\omega_{l,m}$ of the synapse $112_{l,m}$.

This gives a continuous set of possible values for the resonance frequency $\omega_{l,m}$ of the synapse $112_{l,m}$, which enables learning.

Tenth Embodiment (M10)

The embodiment M10 is described by comparison with the embodiment M6.

Figure 30:
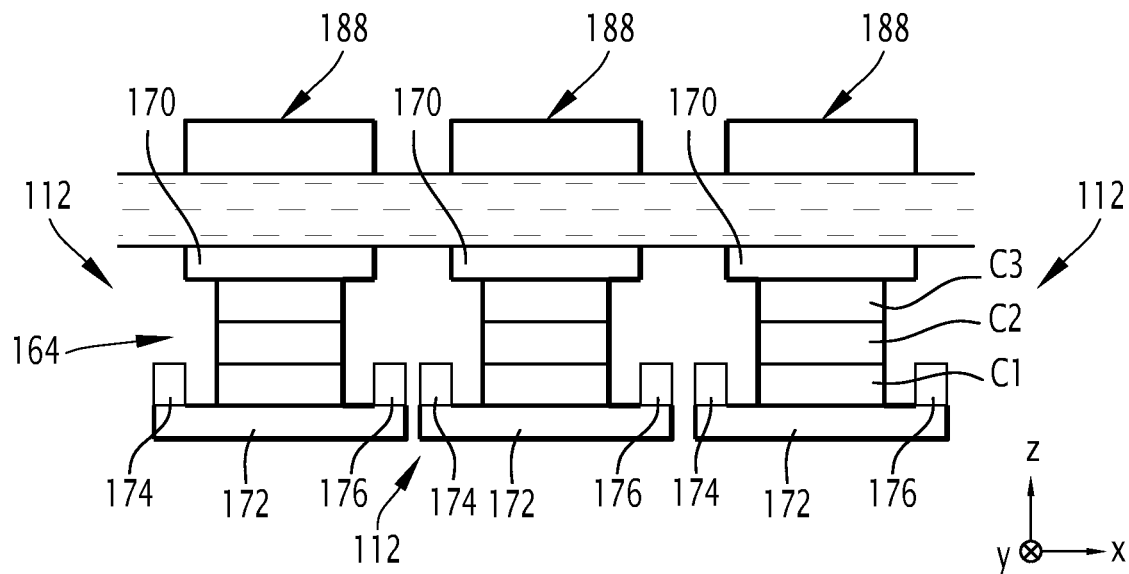
FIG. 30, a schematic representation of an example of resonators and adjustment pads of the interconnection according to a tenth embodiment.

The embodiment M10 is shown in FIG. 30.

In the case of the embodiment M10, the interconnection 104 has a current generator (not shown in this Figure) which is suitable for applying continuous currents.

The adjustment element 188 is an assembly of control lines.

Each control line is connected to the current generator.

Each control line is perpendicular to the transmission line 162 (not shown in this Figure).

In addition, each control line is arranged on a plate made of insulating material.

The plate is in contact with each second terminal 170 of the resonators 164 belonging to the same synaptic chain 110.

The memories 154 are, moreover, able to store the value of the amplitude of the current applied to each control line.

In this example, the memories 154 are spin transfer-controlled memory cells (ST MRAM).

As explained above, such the memories 154 are spin valves or magnetic tunnel junctions having a structure similar to the resonator 164. Ideally, the memories 154 and 164 resonators are identical in structure.

Preferably, each 154 memory is made of the same materials and stacks as the resonators 164 to facilitate the fabrication of the interconnection 104.

In operation, the application of a current generates a magnetic field on the corresponding resonator 164.

The modification of the characteristics of the current thus allows to continuously modify the value of the resonance frequency $\omega_{l,m}$ of the synapse $112_{l,m}$.

In addition, it should be denoted that the values of the amplitude of the current applied to each control line are stored in a respective memory 154. This makes it possible to know the value of the resonance frequency $\omega_{l,m}$ of the synapse $112_{l,m}$ and thus the synaptic weight of the synapse $112_{l,m}$ under consideration.

Eleventh Embodiment (M11)

The embodiment M11 is described in contrast to the embodiment M10.

Each control line is connected directly to the second terminal 170 of the resonator 164 to which the control line is related to the resonator 164.

In such a case, each control line is made of a metal with a strong spin Hall effect.

In such a case, the application of the current through the second terminal 170 to the resonator 164 leads to a spin current through the third layer C3 by Rashba effect or by spin Hall effect which has the consequence of modifying the value of the resonance frequency $\omega_{l,m}$ of the synapse $112_{l,m}$.

The Rashba effect is a bursting of the spin bands of a layer which depends on the applied moment. This effect is a combined effect of spin-orbit interaction and asymmetry of the crystal potential. Such an effect is similar to the particle and anti-particle burst predicted by the model resulting from the use of Dirac's Hamiltonian.

In quantum mechanics, spin-orbit interaction is an interaction between the spin of a particle and the motion of the particle. The spin-orbit interaction is also called spin-orbit effect or spin-orbit coupling.

Twelfth Embodiment (M12)

The embodiment M12 is described in contrast to the embodiment M7.

Figure 31:
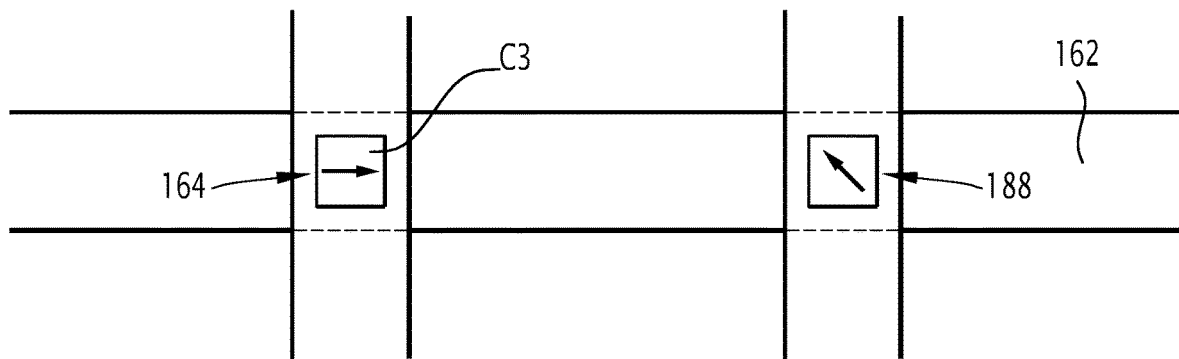
FIG. 31, a schematic representation of an example of a resonator and interconnection adjustment pad according to a twelfth embodiment.

FIG. 31 shows the embodiment M12, for example.

In operation, similarly to the embodiment M10, a spin or spin-orbit torque transfer controls the orientation of the magnetization of the third layer C3 of the adjustment element 188.

However, in this case of the embodiment M12, the current generator is able to apply multiple current amplitudes so that the orientation of the magnetization of the third layer C3 of the adjustment element 188 is continuously adjustable.

The different amplitude values of the charging current are stored in memories 154.

It should be denoted that alternatively, with the same operation, the embodiment M12 corresponds to the embodiment M6.

Thirteenth Embodiment (M13)

The embodiment M13 is described in contrast to the M11 embodiment.

Figure 32:
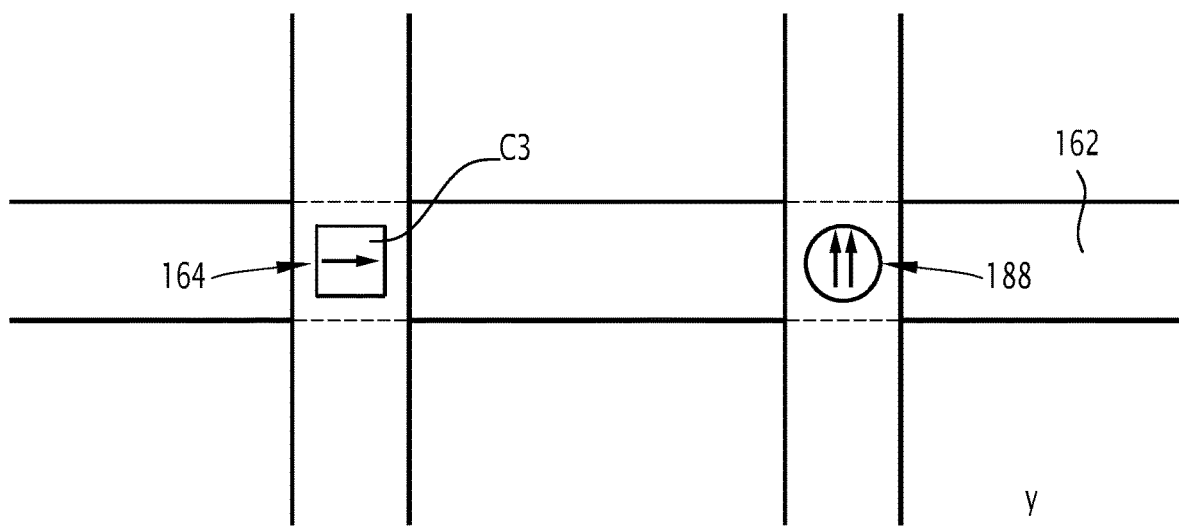
FIG. 32, a schematic representation of an example of a resonator and interconnect adjustment pad according to a thirteenth embodiment.

The embodiment M13 is shown in FIG. 32.

The adjustment pad 188 has a vortex-type magnetization and the field applied by the adjustment element 188 is in the second transverse direction Y. This difference is shown in FIG. 32 with the representation of arrows corresponding to the orientation of the magnetization in the third layer C3 of the adjustment element 188.

Conclusion

In conclusion, it should be denoted that each embodiment M1 to M13 is based on spin diodes.

This implies that the synaptic chains 110 of each embodiment M1 to M13 comprise an assembly of synapses 112, each synapse 112 comprising a resonator 164, the resonator 164 being a spintronic resonator. The resonators 164 are electrically connected in series alternately by the transmission line 162. The alternating connection is specifically described with reference to FIG. 11.

The transmission line 162 thus plays a dual role in each of the embodiments M1 to M13, with the exception of embodiment M5: collecting the rectified signals and transmitting the radiofrequency signals coming from the upstream neuron layer.

Other advantageous embodiments have been highlighted.

Moreover, it has been shown that it is advantageous for each resonator 164 to have terminals 168 and 170 and a resonance frequency, each resonator being suitable for generating between terminals 168 and 170 a direct voltage whose amplitude depends on the deviation of the resonance frequency of the resonator from a reference frequency.

Preferably, each resonator 164 is provided with a resonance frequency adjustment element 188 to achieve neural networks 100 reconfigurable in a binary way or with an infinity of variables. The adjustment element 188 is selected from the group consisting of:

a magnetic pad suitable for generating a magnetic field on the resonator, a pad with a variable magnetization according to the current applied to the pad, a non-magnetic field line powered by a current suitable for creating a magnetic field on the resonator, and a layer made of a material with a different configuration depending on the current or voltage applied to the layer.

According to a certain advantageous embodiment, at least one resonator 164 comprises a stack of layers superimposed in a stacking direction, the stack comprising a first layer of ferromagnetic material, a layer of non-magnetic material and a second layer of ferromagnetic material, the layer of non-magnetic material being interposed between the two layers of ferromagnetic material. Preferably, the layer of non-magnetic material is an insulator.

In a variant, at least one resonator 164 has a single layer made of a material with anisotropic magnetoresistance properties.

Example 2: Architecture with Inverse Spin Hall Effect

First Case of Example 2: Fixed Network

Fourteenth Embodiment (M14)

The embodiment M14 is described by comparison with the embodiment M3.

Figure 33:
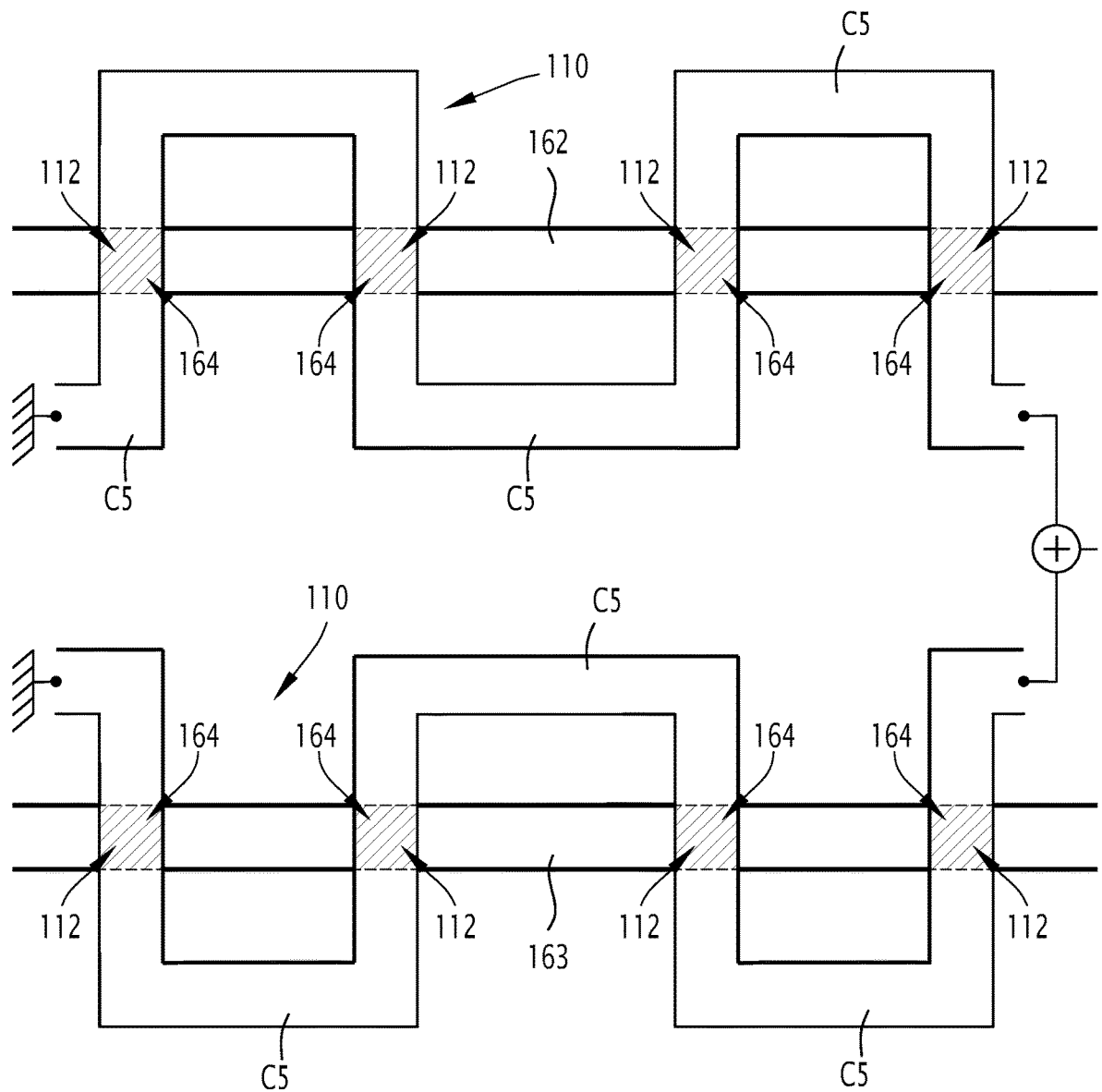
FIG. 33, a schematic representation of an example of a part of the interconnection according to a fourteenth embodiment.
Figure 34:
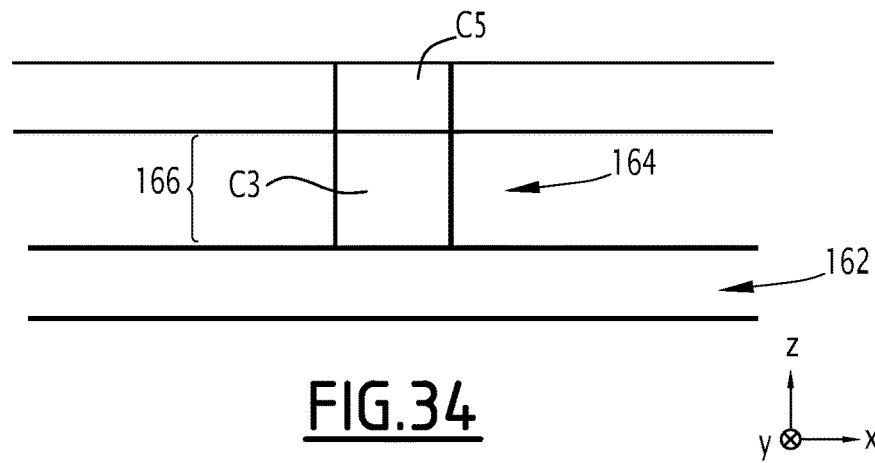
FIG. 34, a schematic representation of an example of the resonator arrangement according to the fourteenth embodiment.

The embodiment M14 is shown in FIGS. 33 and 34.

In this case, a chain 110 has a second transmission line 163 with the synapses 112.

The two transmission lines 162 and 163 and the synapses 112 are arranged so that a synapse 112 of a first transmission line 162 is opposite a synapse 112 of a second transmission line 163.

According to the example in FIG. 33, each transmission line has four synapses 112 so that the first synapse 112 of the first transmission line 162 faces the first synapse 112 of the second transmission line 163, the second synapse 112 of the first transmission line 162 faces the second synapse 112 of the second transmission line 163, the third synapse 112 of the first transmission line 162 is opposite the third synapse 112 of the second transmission line 163 and the fourth synapse 112 of the first transmission line 162 is opposite the fourth synapse 112 of the second transmission line 163.

In the case shown, the two transmission lines 162 and 163 are parallel and extend mainly along the first transverse direction X. As a result, the position of two corresponding synapses 112 of the two transmission lines is the same along the first transverse direction X.

An insulating layer can be inserted between layer C3 and one of the two transmission lines 162 or 163.

In addition, each resonator 164 is provided with a converter. The converter is suitable for converting a spin current in the layer C3 of the resonator 164 into a load current by inverse spin Hall effect.

The inverse spin Hall effect is the conversion of a spin current propagating in one direction of propagation into a load current in the direction orthogonal to the direction of propagation.

The converter has a C5 conversion layer.

The conversion layer C5 is made of a fifth material MAT5.

The fifth material MAT5 is a metal with a strong inverse spin Hall effect, that is, allowing an efficient conversion of the spin current into a load current.

As an example, the fifth material MAT5 is Pt, W, Pd, Au, Ag, Ir, Bi or CuBi.

According to the example of FIG. 34, the conversion layer C5 is in contact with layer C3.

According to the example in FIG. 33, the converters of the resonators 164 of the same transmission line 162 are electrically connected in series to form a conversion line.

Thus, chain 110 also has two conversion lines.

In the example in FIG. 33, the conversion lines are arranged in a meander shape.

The meander can be circular, triangular or rectangular.

Only the rectangular case is described in what follows, the conversion to circular or triangular shapes being immediate.

In this case, the conversion lines are formed by an assembly of first line portions and second line portions. The first portions extend mainly along the first transverse direction X while the second portions extend mainly along the second transverse direction Y. Due to the meandering arrangement, each conversion line has alternating first and second line portions.

The arrangement of the first line portions and the second line portions is such that each second line portion completely covers the resonator 164.

In addition, the two conversion lines are such that the first line portions are alternately near and far. Specifically, the first line portions that are in the space between the two conversion lines have a corresponding positioning. Similarly, the first line portions that are outside the space between the two conversion lines have corresponding positioning.

However, it should be denoted that alternatively, the positioning is staggered because the conversion lines are completely independent.

At the end of the conversion lines, the chain 110 has an adder.

The adder is suitable for adding the potentials of the two conversion lines to obtain an output potential.

In a variant, instead of a component, the adder is achieved as an electrical connection of the two conversion lines in series.

In operation, the radiofrequency current (multiplexed and amplified in the case described) coming from the neurons 106 via transmission line 162 creates a radiofrequency magnetic field on the stack 166 of each the resonator 164 in the chain. Thus, when a radiofrequency current $I_i^{RF} \cos(\omega_i \cdot t)$ is applied in the transmission line 162 and acts on a resonator 164 implementing a synapse $112_{l,m}$, the radiofrequency field generated will cause a precession of the magnetization of the layer C3.

In a variant, the precession of the layer C3 may be due to spin waves emitted by the neurons 106 of the previous layer and transmitted by the transmission line.

In addition, it should be denoted that each resonator 164 can operate according to one of the magnetic configurations of each of the layers illustrated in FIGS. 13 to 18, and thus in particular according to configurations with vortex. This observation applies to all the structures that will be described later in the application.

The amplitude of the precession is all the greater the higher the amplitude of the radiofrequency current $I_i^{RF}$ and the closer the frequency $\omega_i$ is to the resonance frequency $\omega_{l,m}$ of the magnetic layer C3.

In the linear regime of low perturbations, the amplitude of the oscillation θ of the precession is proportional to the radiofrequency current.

By the so-called spin pumping or spin battery effect, the magnetization precession in the layer C3 generates a direct spin current $I_s$ in the converter C5 placed near the resonator 164.

By the so-called spin pumping or spin battery effect, a ferromagnetic material with precession magnetization injects a spin current into an adjacent conductor through an ohmic contact, independently of the respective conductance of the two materials.

The amplitude of the direct spin current $I_s$ increases when at least one of the oscillation amplitude θ of the precession and of the resonance frequency of the resonator 164 increases.

In the converter, the direct spin current $I_s$ is converted into a direct voltage by inverse spin Hall effect. The amplitude of the direct voltage increases with the amplitude of the direct spin current $I_s$ and the amplitude of the spin Hall effect. The amplitude of the direct voltaget also depends on magnetic parameters.

The rectified voltage between the two terminals of the resonator 164 is the weighted sum of a purely electrical contribution $$1\frac{1}{2}\frac{\partial^2 V}{\partial I^2}(I_i^{RF})^2$$

and a Lorentzian contribution due to the inverse spin Hall effect.

As a result, it is possible to obtain at the terminals of the resonator 164 corresponding to the synapse 112$_{l,m}$ a rectified voltage proportional to $I_i^{RF}$ and dependent on $(\omega_i/\omega_{l,m})$.

Since the Lorentzian function does not change its sign, the first conversion line thus produces a first part of the synaptic weights.

The second conversion line 163 produces a second part of the synaptic weights.

Due to the mirror arrangement of the first portions of the conversion lines, both parts correspond to opposite sign contributions to the synaptic weights.

The alternating series connection of the converters of the resonators 164 in the chain 110$_l$ makes it possible to sum the rectified voltages of each synapse 112$_{l,m}$ of the chain 110$_l$ while largely eliminating purely electrical terms such as $$\frac{1}{2}\frac{\partial^2 V}{\partial I^2}(I_i^{RF})^2.$$

Thus, the voltage at the terminals of the conversion line C5 running through the entire 110$_l$ chain is proportional to the sum of the radiofrequency signals coming from the neurons of the previous layer weighted by the ratio between the frequencies of the neurons and the synapses of the chain. The resulting voltage can then be sent to the post-processing circuit 156, and then fed to the neuron 106$_i^{(k+1)}$, which corresponds to making the inference.

Second Case of Example 2: Binary Reconfigurable Network

Fifteenth Embodiment (M15)

The embodiment M15 is described in contrast to the embodiment M14.

Figure 35:
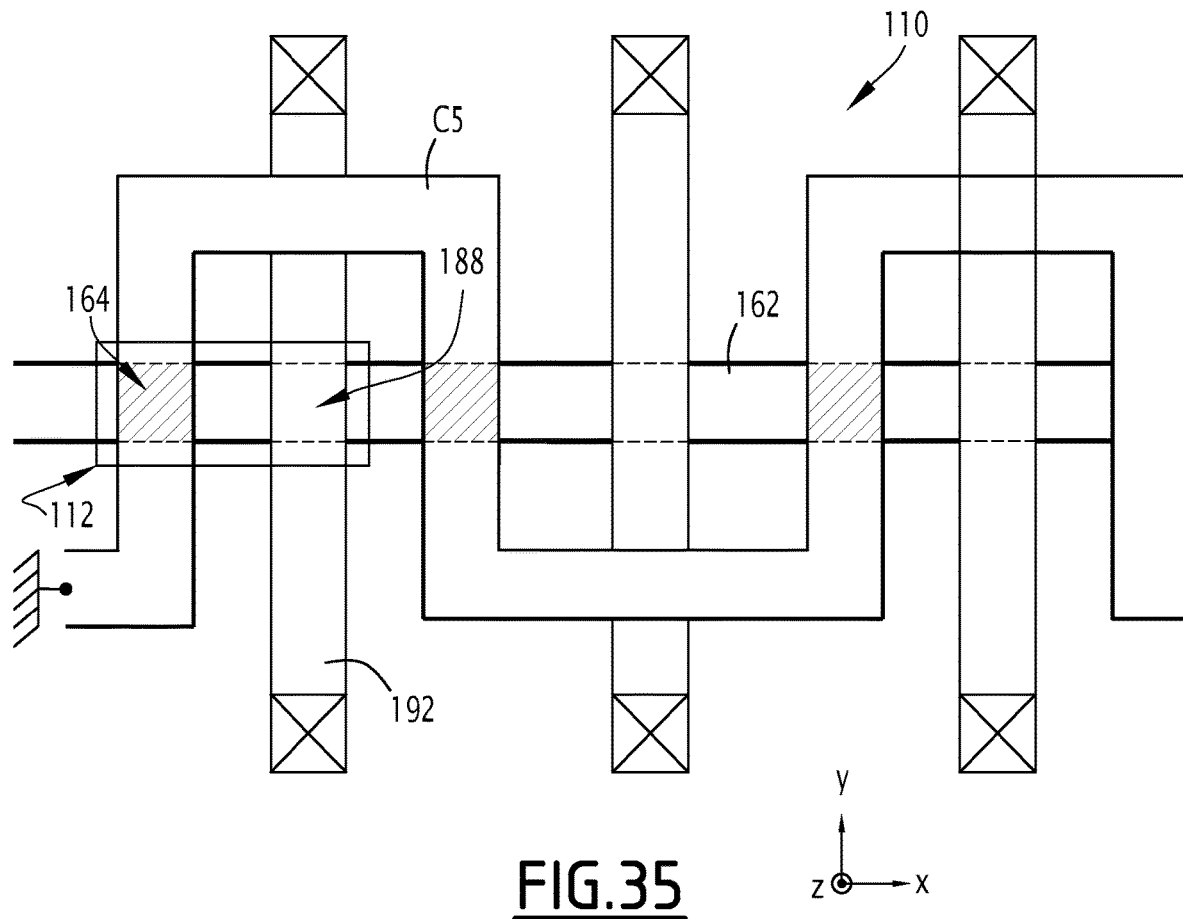
FIG. 35, a schematic representation of an example of a part of the interconnection according to a fifteenth embodiment.

In particular, the embodiment M15 is shown in FIG. 35.

Each synapse 112 has an adjustment element 188 for the resonance frequency of the resonator 164. The adjustment element 188 consists of at least one ferromagnetic layer.

Figure 36:
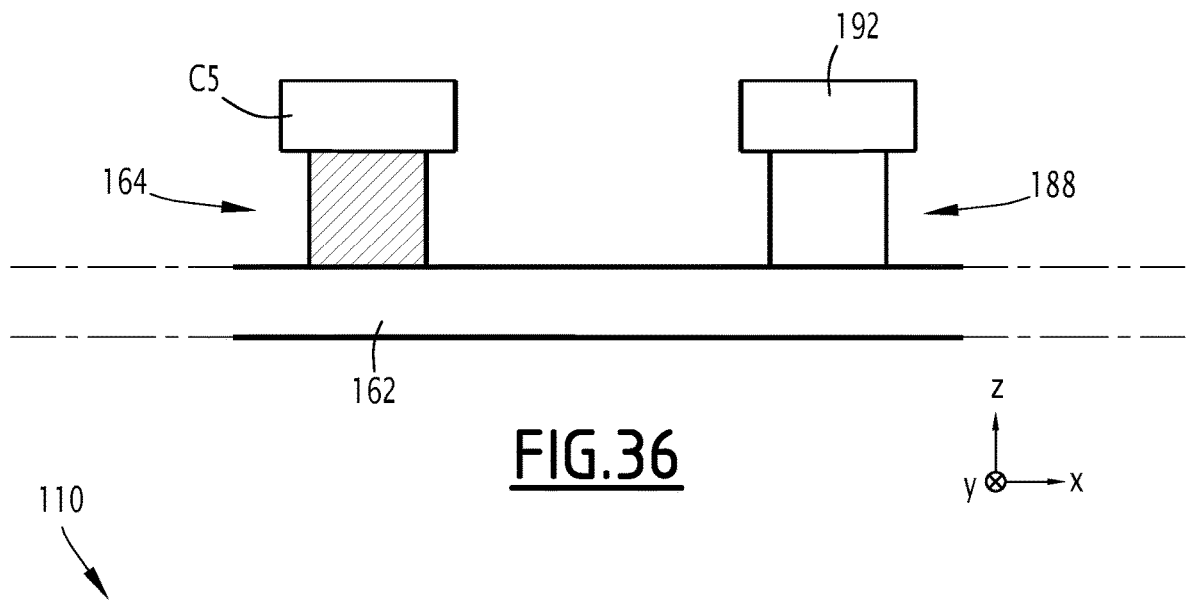
FIG. 36, a schematic side view of an enlarged view of FIG. 35.

In addition, as shown in FIG. 36, each adjustment element 188 is in contact with a respective power supply line 192 made of a heavy metal with a strong spin Hall effect.

During operation, a load current is injected individually into each heavy metal line. Depending on the sign of the load current, the magnetization of the adjustment element 188 is changed in one direction or the other by the torque due to the spin Hall effect. Once the magnetization is switched, the load current is switched off with the magnetization in the equilibrium position.

Sixteenth Embodiment (M16)

The embodiment M16 is described in contrast to the embodiment M15.

Figure 37:
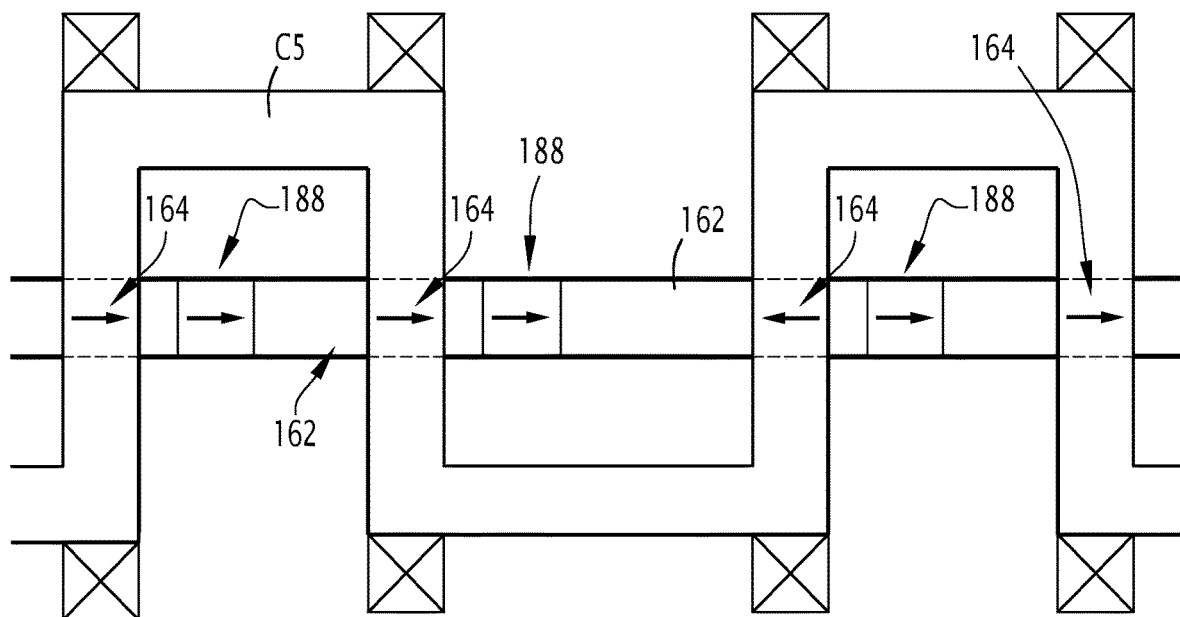
FIG. 37, a schematic representation of an example of a part of the interconnection according to a sixteenth embodiment.

In particular, the embodiment M16 is shown in FIG. 37.

In this case, adjustment element 188 is not provided with a heavy metal feed line.

As can be seen in FIG. 37, the adjustment element 188 is placed next to the resonator 164.

During operation, a load current is sent to the conversion line, which switches the magnetization of the resonator 164 in the desired direction according to the sign of the current applied by the torque due to the spin Hall effect. Once the magnetization is switched, the load current is switched off with the magnetization in the equilibrium position.

Seventeenth Embodiment (M17)

The embodiment M17 is described in contrast to the embodiment M16.

Figure 38:
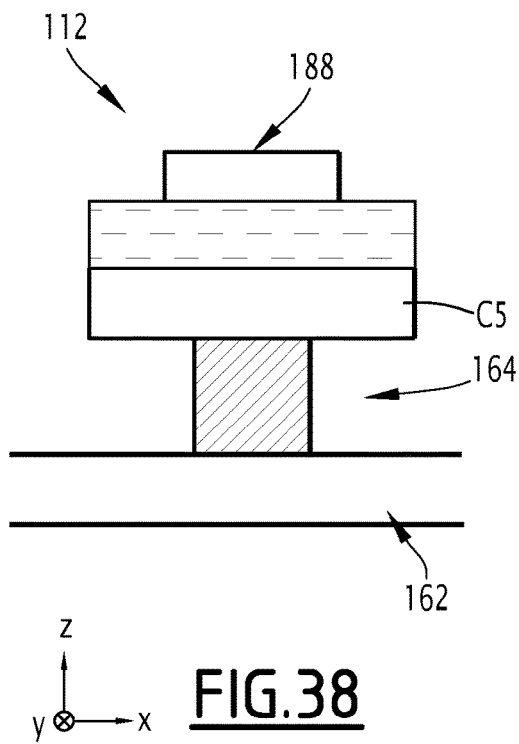
FIG. 38, a schematic representation of an example of a resonator and adjustment pad of the interconnection according to a seventeenth embodiment.

In particular, the embodiment M17 is shown in FIG. 38.

When observing the operation of the embodiment M16, it should be denoted that the exact location of the adjustment element 188 is irrelevant for the operation of the entire structure.

For example, in the case of FIG. 38 corresponding to the embodiment M17, the adjustment element 188 is positioned above a resonator 164.

In such a case, a stack is obtained comprising from bottom to top the transmission line 162, the resonator 164, the conversion layer, the layer of insulating material and the adjustment element 188.

Eighteenth Embodiment (M18)

The embodiment M18 mode is described in contrast to the embodiment M15.

Figure 39:
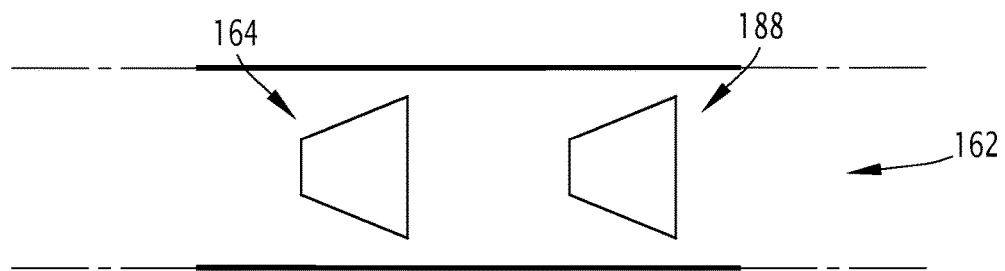
FIG. 39, a schematic representation of an example of a resonator and interconnection adjustment according to an eighteenth embodiment.

In particular, the embodiment M18 is shown in FIG. 39.

According to the embodiment M18, the neural network 100 has the characteristics of a neural network 100 according to one of the above-mentioned embodiments (embodiments M15 to M17) and at least one of the resonator 164 and the adjustment element 188 has a cross-section in a sectional plane normal to the stacking direction Z that is asymmetrical.

Preferably, as in the case of FIG. 39, the asymmetrical cross-section is the same for the resonator 164 and the adjustment element 188.

According to the example in FIG. 39, the section is a trapezoidal shaped section.

In operation, this can result in four distinct resonant frequencies. These four resonance frequencies are derived from the four distinct magnetic configurations of the magnetization of the resonator 164 and the adjustment element 188.

Third Case of Example 2: Network Suitable for Learning

Nineteenth Embodiment (M19)

The embodiment M19 is described by comparison with the embodiment M14.

According to the embodiment M19, each the resonator 164 has a fourth layer C4 similar to the embodiment M9.

The operation is the same as for the M9 implementation.

Twentieth Embodiment (M20)

The embodiment M20 is described in contrast to the embodiment M14.

According to the embodiment M20, the adjustment element 188 is an assembly of control lines with the same structural and functional properties as the embodiment M10.

Twenty-First Embodiment (M21)

The embodiment M21 is described by comparison with the embodiment M20.

Figure 40:
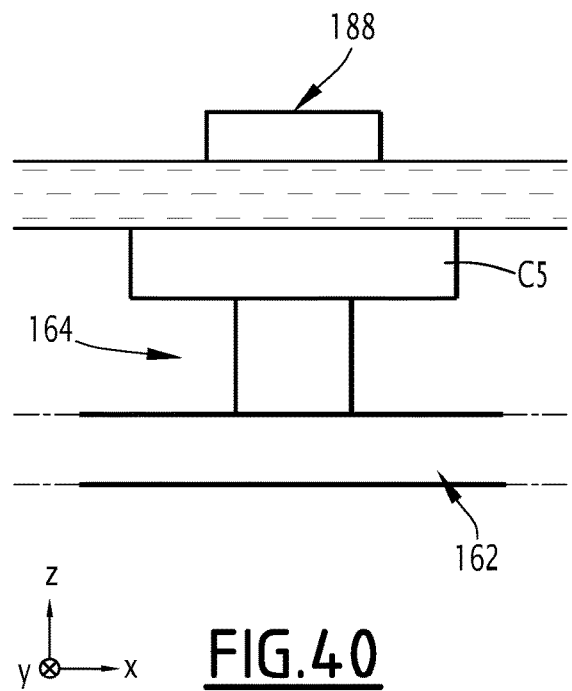
FIG. 40, a schematic representation of an example of a resonator and interconnection adjustment according to a twenty-first embodiment.

FIG. 40 shows the corresponding structure.

According to the embodiment M21, the adjustment element 188 is an assembly of control lines with the same structural and functional properties as in the embodiment M11.

Conclusion

In conclusion, it should be denoted that each embodiment M14 to M21 is based on the combined effects of spin pumping (also called spin battery) and the inverse spin Hall effect.

In particular, each embodiment is such that the assembly of synapses comprises a converter made of a metal with a strong inverse spin Hall effect, a transmission line transmitting the microwave signals emitted by the neurons of the previous layer (microwave currents, electromagnetic fields or spin waves), and synapses, each synapse being a spintronic resonator, the spintronic resonators in contact with the converter, each resonator being a magnetic pad, each resonator having a resonance frequency, each resonator being suitable for generating a spin current whose amplitude depends on the ratio of the resonance frequency of the resonator to a reference frequency, the converter being suitable for converting each spin current into a load current.

In addition, the resonators are connected by the converter in an alternating manner, the alternating connection being defined with reference to FIG. 33.

In addition, the metal of the converter is a heavy metal with a strong inverse spin Hall effect. The converter metal is an alloy comprising one or more of the elements from the group consisting of Pt, W, Pd, Au, Ir, Ag and Bi.

In addition, according to certain embodiments, each resonator is provided with an additional layer made of an oxide, ferroelectric or phase-change material.

In a variant, each resonator is provided with a resonance frequency adjustment element, the adjustment element being selected from the group consisting of:

a magnetic pad suitable for generating a magnetic field on the resonator, a pad with a variable magnetization according to the current applied to the pad, a non-magnetic field line powered by a current suitable for creating a magnetic field on the resonator, and a layer made of a material with a different configuration depending on the current or voltage applied to the layer.

Advantageously, the magnetic pad is in contact with the conversion line, an insulating material being interposed between the magnetic pad and the transmission line and/or each pad has a trapezoidal cross-sectional shape.

Example 3: Architecture with Passive Resonator

First Case of Example 3: Fixed Network

In the case illustrated, the neural network 100 is a fixed network.

Twenty-Second Embodiment (M22)

The embodiment M22 is described in contrast to the embodiment M1.

Figure 41:
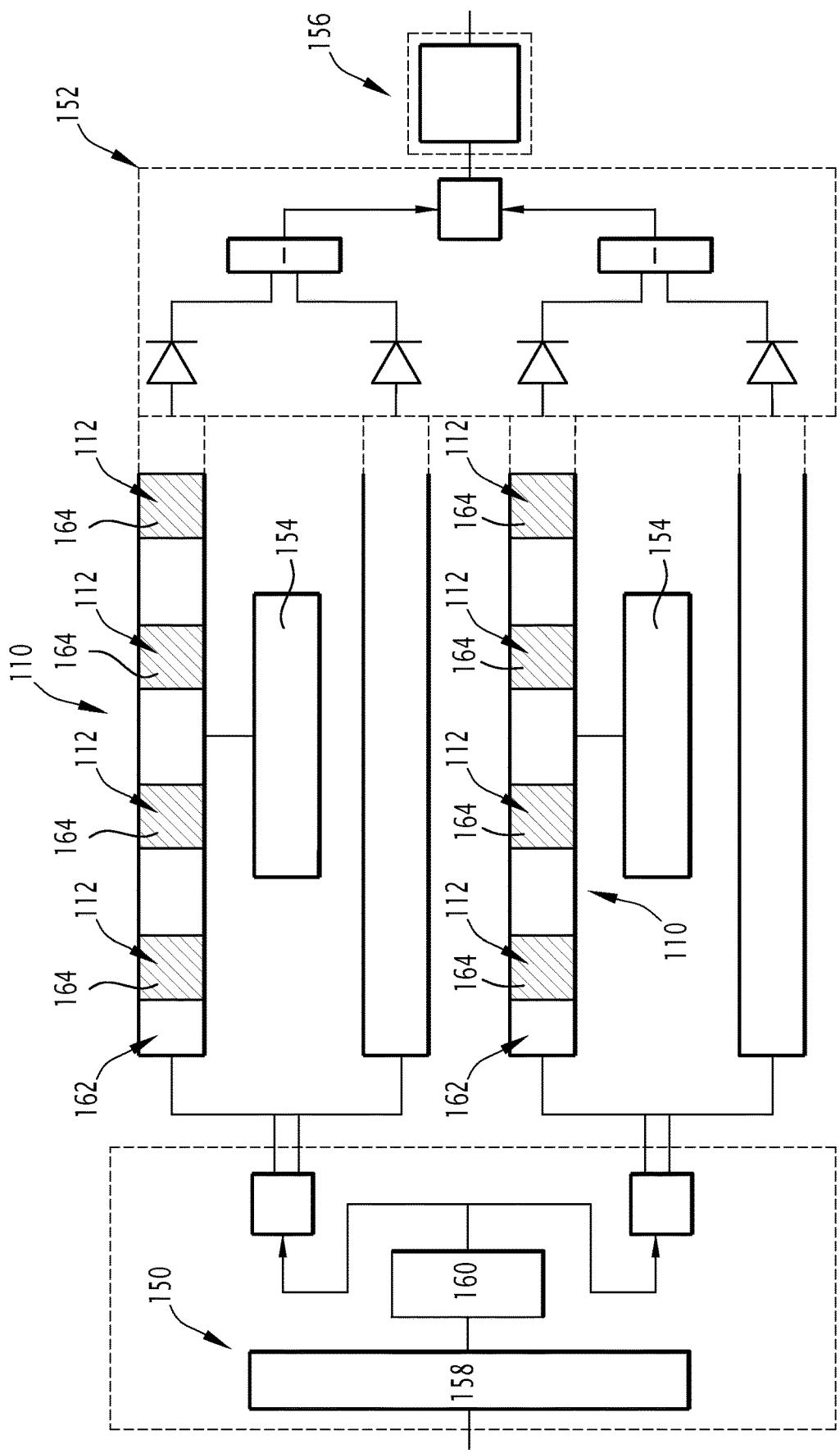
FIG. 41, a schematic representation of the interconnection according to a twenty-second embodiment.
Figure 42:
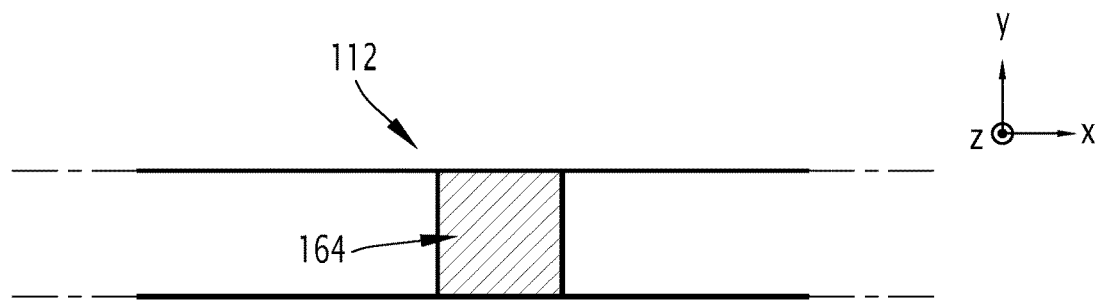
FIG. 42, a schematic representation of an example resonator according to the interconnection according to a twenty-second embodiment.
Figure 43:
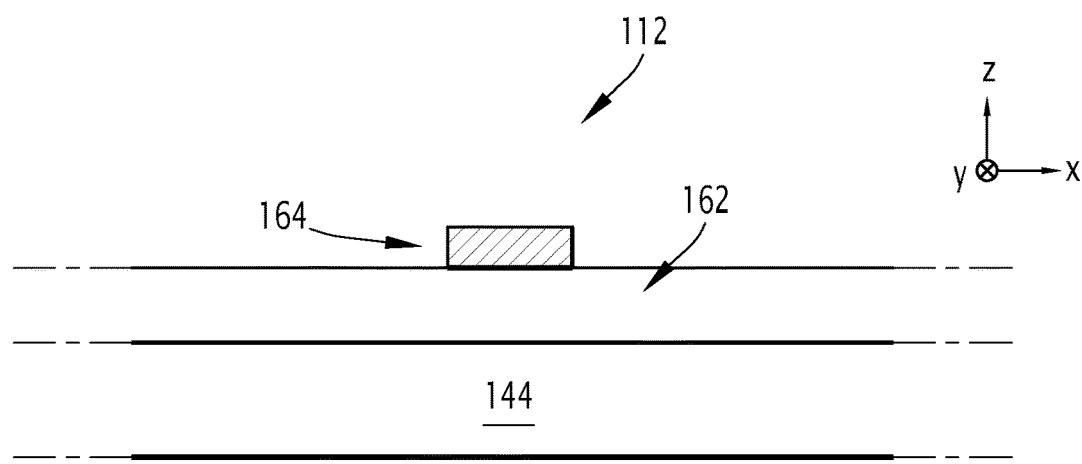
FIG. 43, a schematic representation of an example of a resonator of the interconnection according to a twenty-second embodiment.

The embodiment M22 is shown in FIGS. 41 to 43.

With reference to FIG. 41, each chain 110 has two sub-strings, the first sub-string having the function to implement the positive part of the synaptic weights and the second sub-string having the function to implement the negative part of the synaptic weights.

The first sub-string consists of a separator, synapses 112, a transmission line 162 and a reference line.

For example, the separator is a divider for radio frequency signals.

The transmission line 162 extends along the first transverse direction X.

The transmission line 162 has an input and an output.

The transmission line 162 is in contact with the substrate as shown in FIG. 43.

In the example described, the transmission line 162 and the reference line are parallel to each other.

Each synapse 112 is a resonator 164 with a single layer C3 having the same properties as the third layer C3 in the first structure of the first case of example 1. Since the resonator 164 has no terminals, the resonator 164 is passive.

The resonators 164 are placed in series above transmission line 162 as shown in FIGS. 41 and 42, so that in FIG. 43, a stacking of the resonator 164, transmission line 162 and the substrate is observed.

In a variant, the resonators 164 are placed below transmission line 162.

The reference line has the same geometry as transmission line 162.

The reference line also has an input and an output.

As can be seen in FIG. 41, the rectification circuit 152 includes diodes.

One diode is connected to the output of each transmission line 162 and to the output of each reference line.

The diode is, for example, a CMOS-type diode.

The diode converts the incident radio frequency signal into a continuous signal.

Any other device that can perform the same function is possible.

As an example, instead of a diode, a radio frequency power detector is used.

The rectification circuit 152 also includes a first subtractor.

The first subtractor is suitable for subtracting the direct voltages at the output of the diodes.

Preferably, the first subtractor is also achieved using CMOS technology.

The rectification circuit 152 also includes a second subtractor which is able to subtract the output of the first subtractor of the first substring from the output of the first subtractor of the second substring.

The post-processing circuit 156 includes an amplifier.

During operation, the output signals of neurons 106 are transmitted to the pre-processing circuit 150.

The output signals of the neuron 106 are multiplexed and amplified by the pre-processing circuit 150.

At a substring as shown in FIG. 41, the multiplexed microwave currents I(k) from the neuron 106 are separated into a first and a second signal by the splitter, both signals being identical.

The first signal is sent to the transmission line 162 of the first substring.

When the first signal passes, the magnetization of the resonators 164 is precessioned, thus absorbing part of the first signal.

The higher the resonant frequencies of the resonators 164 and the oscillator oscillation frequencies, the higher the absorption.

The output signal of the transmission line 162 is denoted $I_j^{OUT-REF}$.

Similarly, the second signal is sent to the reference line of the first substring. In the absence of absorption by a resonator 164, the output signal is a reference signal denoted $I_j^{OUT-REF}$.

Each output signal $I_j^{OUT-REF}$ and $I_j^{OUT-REF}$ is rectified by the rectification circuit 152.

The signals obtained at the output of the rectification circuit 152 are then subtracted by the first subtractor.

This gives a first positive voltage at the output of the first substring, denoted $V_{DC,j}^+$.

The same operation applies to the second substring, which gives a second negative voltage $V_{DC,j}^-$.

Using the second subtractor, a total voltage $V_{DC,j}^{TOT}$ is obtained, checking:

$$V_{DC,j}^{TOT} = V_{DC,j}^+ - V_{DC,j}^-$$

The total voltage $V_{DC,j}^{TOT}$ of chain 110 is then amplified by the amplifier of post-processing circuit 156 and sent to neuron 106 of the downstream layer.

Twenty-Third Embodiment (M23)

The embodiment M23 is described by comparison with the embodiment M22.

Figure 44:
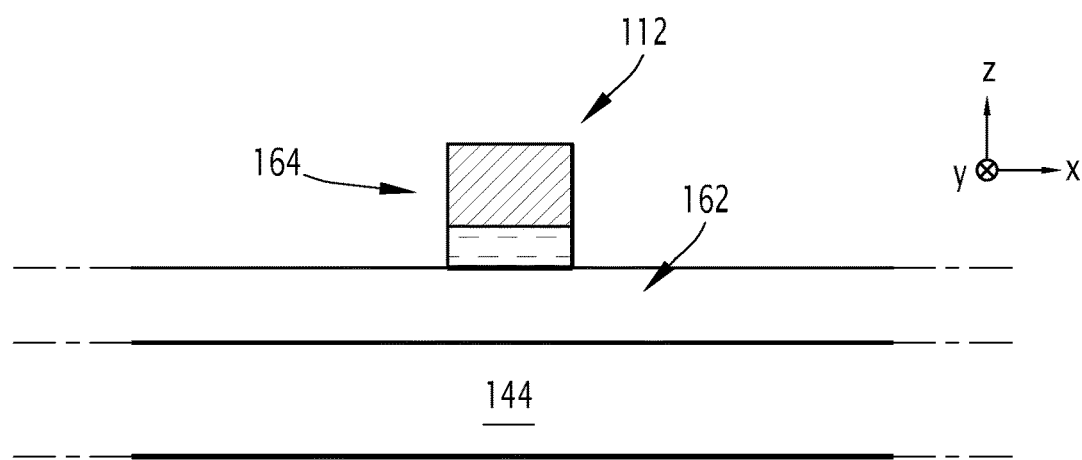
FIG. 44, a schematic representation of an example of a resonator of the interconnection according to a twenty-third embodiment.

According to the embodiment M23 illustrated in FIG. 44, the resonators 164 are arranged at a distance from the transmission line 162. In this case, a layer of insulating material is placed between the transmission line 162 and each resonator 164.

In a variant, the resonators 164 are arranged under the transmission line 162 and in contact with the transmission line 162. In this case, a layer of insulating material is placed between the transmission line 162 and the resonators 164.

The operation of the M23 embodiment is identical to that of the M22 embodiment described above.

The use of the embodiment M23, in particular the use of the insulator, reduces the absorption effect and at the same time avoids changing the conductivity of the transmission line 162.

Twenty-Fourth Embodiment (M24)

The embodiment M24 is described in contrast to the embodiment M22.

According to the embodiment M24, the reference line is marked with studs made of non-magnetic metal.

The non-magnetic metal studs have the same dimensions as the resonators 164.

In addition, the non-magnetic metal pads have a conductivity equal to the conductivity of the resonators 164 to within 2%.

This results in better accuracy of the reference signal.

Second Case of Example 3: Binary Reconfigurable Network

In the example shown, the neural network 100 is a binary reconfigurable network.

Twenty-Fifth Embodiment (M25)

The embodiment M25 is described by comparison with the embodiment M22.

It is assumed that the resonators 164 have a uniform magnetization, the transposition in the case of vortex magnetization being immediate.

Each synapse 112 has an adjustment element 188 of the corresponding frequency resonator 164 with the same properties as the embodiment M15.

In addition, each contact element is in contact with a respective heavy metal supply line having a strong spin Hall effect.

In operation, a load current is injected individually into each heavy metal line. Depending on the sign of the load current, the magnetization of the adjustment element 188 is changed in one direction or the other by the torque due to the spin Hall effect. Once the magnetization is switched, the load current is switched off with the magnetization in the equilibrium position.

Twenty-Sixth Embodiment (M26)

The embodiment M26 is described by comparison with the embodiment M25.

In this case, the adjustment element 188 is the same as for the embodiment M16.

The function of the adjustment element 188 is also the function of the adjustment element 188 of the embodiment M7.

Twenty-Seventh Embodiment (M27)

The embodiment M27 is described by comparison with the embodiment M25.

According to the embodiment M27, the adjustment element 188 is positioned differently.

In this case, the adjustment element 188 is positioned above the layer C3 so that a stack 166 of the adjustment element 188, barrier layer, layer C3 and separating layer is obtained. The adjustment element 188 is in contact with a metal line while the separating layer is in contact with the transmission line 162. Thus, the resulting stack is a magnetic tunnel junction or spin valve.

In addition, the neural network 100 is provided with a current injector arranged to generate a current flowing through the stack 166 from the metal line to the transmission line 162, that is, a current in a direction parallel to the stacking direction Z.

In operation, this means that switching of the first layer C3 is achieved by spin transfer.

Third Case of Example 3: Network Suitable for Learning

In the example shown, the neural network 100 is a network suitable for learning.

Twenty-Eighth Embodiment (M28)

The embodiment M28 is described by comparison with the embodiment M25.

In this case, the adjustment element 188 is that of the embodiment M19.

The function of the adjustment element 188 is also the function of the adjustment element 188 of the embodiment M19.

Twenty-Ninth Embodiment (M29)

The embodiment M29 is described by comparison with the embodiment M25.

In this case, the adjustment element 188 is an assembly of control lines with the same properties in terms of structure and operation as the embodiment M20.

Thirtieth Embodiment (M30)

The embodiment M30 is described by comparison with the embodiment M25.

According to the embodiment M30, the adjustment element 188 is an assembly of control lines with the same structural and functional properties as the embodiment M11.

Thirty-First Embodiment (M31)

The embodiment M31 is described by comparison with the embodiment M25.

According to the embodiment M31, the adjustment element 188 is a stack of layers 166 with the same structural and functional properties as the embodiment M12.

Conclusion

The set of embodiments M22 to M31 corresponds to the adaptation of the previously described structures (with spin diode and inverse spin Hall effect) for the case of a passive the resonator 164. Such a resonator 164 is, indeed, easy to fabricate.

General Conclusion

Among the assembly of embodiments presented to achieve a neural network 100 that is deep, there are common points that are highlighted in the following.

Each neural network 100 according to the assembly of embodiments (M1 to M31) is such that the neural network 100 comprises synaptic chains 110, each synaptic chain 110 comprising synapses 112, each synapse 112 being a spintronic the resonator 164, the spintronic resonators 164 being in series, each spintronic resonator 164 having an adjustable resonance frequency. The neural network 100 comprises ordered layers of neurons 102, each neuron 106 being a radio frequency oscillator oscillating at its own frequency, a lower layer being connected to an upper layer by an interconnection 104 comprising a set 108 of synaptic chains 110 connected to rectification circuits, each resonance frequency of the set 108 of synaptic chains 110 corresponding to a natural frequency of a radio frequency oscillator of the lower layer.

According to preferred embodiments, the neural network 100 includes adjustment elements for adjusting the resonance frequency by modifying either the voltage, current or magnetic field applied to a spintronic resonator 164.

In addition, if a plane is defined in which the layers of neurons 102 mainly extend, the synaptic chains 110 can be arranged in this plane or perpendicular to it.

On the other hand, the neurons 106 of the lower layer 102 are suitable for transmitting a signal to synaptic chains 110, the signal being a radio frequency current, a radio frequency magnetic field or a spin wave.

The embodiments also share the fact that each synaptic chain 110 has a transmission line with the resonators 164, whose output is rectified via the rectification circuits 152.

In addition, the neural network 100 comprises multiple spintronic memories 154, each spintronic memory 154 being related to a single synaptic chain 110.

Preferably, the number of layers 102 is greater than 3, preferably greater than 5, and/or the number of synaptic chains 110 in a set is greater than 9, preferably greater than 100.

Moreover, a certain number of embodiments are such that the interconnection 104 comprises a pre-processing circuit 150 and a post-processing circuit 156, the pre-processing circuit 150 comprising one of a multiplexer 158 and an amplifier 160 and the post-processing circuit 156 comprising one of an amplifier and memories.

Other embodiments are possible by combining the above-mentioned embodiments M1 to M31 with the different types of oscillators mentioned above, when technically possible.

The invention claimed is:

1. A neural network including:
    synaptic chains, each synaptic chain comprising synapses, each synapse being a spintronic resonator, the spintronic resonators being in series, each spintronic resonator having an adjustable resonance frequency,
    ordered layers of neurons, each neuron being a radiofrequency oscillator oscillating at its own frequency, a lower layer being connected to an upper layer by an interconnection comprising an assembly of synaptic chains connected to rectifying circuits, each resonance frequency of the assembly of synaptic chains corresponding to the frequency of a radiofrequency oscillator of the lower layer.

2. The neural network according to claim 1, wherein the neurons of the lower layer are suitable for transmitting a signal to the synaptic chains, the signal being a radiofrequency current, a radiofrequency magnetic field or a spin wave.

3. The neural network according to claim 1, wherein the neural network comprises adjustment elements for adjusting the resonance frequency by changing one of the voltage, current or magnetic field applied to a spin resonator.

4. The Neural network according to claim 1, wherein a plane is defined in which the layers of neurons extend, the synaptic chains being arranged perpendicular to the plane.

5. The Neural network according to claim 1, wherein a plane is defined in which the layers of neurons extend, the synaptic chains being arranged in the plane.

6. The neural network according to claim 1, wherein the neural network comprises multiple spintronic memories, each spintronic memory being related to a single synaptic chain.

7. The neural network according to claim 1, wherein the neural network uses positive weights and negative weights, each synaptic chain includes two transmission lines, one line serving as a reference and one line including the resonators, the resonators being passive and each line being connected to two diodes, the assembly of diodes forming the rectifying circuit, the assembly of the two transmission lines making it possible to achieve one of the two weights.

8. The neural network according to claim 1, wherein the number of layers is greater than 3.

9. The neural network according to claim 8, wherein the number of layers is greater than 5.

10. The neural network according to claim 1, wherein the number of synaptic chains in an assembly of synaptic chains is greater than 9.

11. The neural network according to claim 10, wherein the number of synaptic chains in an assembly of synaptic chains is greater than 100.

12. The neural network according to claim 1, wherein the interconnection comprises a pre-processing circuit and a post-processing circuit.

13. The neural network according to claim 12, wherein the pre-processing circuit comprises one of a multiplexer and an amplifier and the post-processing circuit comprises one of a memory and an amplifier.

* * * * *